United States Patent
Handley et al.

(10) Patent No.: US 8,056,510 B2
(45) Date of Patent: Nov. 15, 2011

(54) POTABLE WATER DELIVERY SYSTEM FOR ANIMALS

(75) Inventors: David W. Handley, Waterford, WI (US); Randal S. Knurr, Waterford, WI (US)

(73) Assignee: Edstrom Industries, Inc., Waterford, WI (US)

( * ) Notice: Subject to any disclaimer, the term of this patent is extended or adjusted under 35 U.S.C. 154(b) by 0 days.

(21) Appl. No.: 12/401,661

(22) Filed: Mar. 11, 2009

(65) Prior Publication Data

US 2009/0223462 A1 Sep. 10, 2009

Related U.S. Application Data

(62) Division of application No. 10/940,282, filed on Sep. 14, 2004, now Pat. No. 7,513,218.

(51) Int. Cl.
*A01K 7/00* (2006.01)
(52) U.S. Cl. ............................ 119/72; 119/65
(58) Field of Classification Search ............... 119/51.5, 119/65, 68, 72, 72.5; 383/66, 22, 202, 119
See application file for complete search history.

(56) References Cited

U.S. PATENT DOCUMENTS

| | | | |
|---|---|---|---|
| 2,190,420 A | | 2/1940 | Frederick et al. |
| 2,329,347 A | * | 9/1943 | Graham .......................... 119/71 |
| 2,697,531 A | | 12/1954 | Hood |
| 2,708,421 A | | 5/1955 | Jauch |
| D201,737 S | * | 7/1965 | Ilg et al. ........................ D24/118 |
| 3,340,671 A | | 9/1967 | Loo |
| 3,416,528 A | * | 12/1968 | Kahn ............................ 604/411 |
| 3,453,661 A | * | 7/1969 | Repko ............................ 401/132 |
| 3,581,713 A | | 6/1971 | Crooks et al. |
| 3,762,606 A | | 10/1973 | Lande |
| 3,930,286 A | * | 1/1976 | McGowen ....................... 222/83 |
| 3,958,535 A | | 5/1976 | Salvia |
| 4,022,159 A | | 5/1977 | Salvia |
| 4,090,541 A | * | 5/1978 | Cammarata et al. .......... 604/408 |
| 4,130,088 A | | 12/1978 | Salvia |
| 4,417,607 A | | 11/1983 | Scholle et al. |
| 4,432,763 A | * | 2/1984 | Manschot et al. ............. 604/262 |
| 4,484,351 A | * | 11/1984 | de Leeuwe et al. ................ 383/9 |
| 4,553,970 A | * | 11/1985 | Lewis, Jr. ....................... 604/408 |
| RE32,065 E | * | 1/1986 | Ralston et al. ................. 604/408 |
| 4,636,412 A | * | 1/1987 | Field .............................. 604/408 |

(Continued)

OTHER PUBLICATIONS

Laboratory Animal Research Products, *SterilGARD III Advance Animal Transfer Station with Adjustable Mobile Lift*, The Baker Company (2 pages) (2004).

(Continued)

*Primary Examiner* — Son T Nguyen
(74) *Attorney, Agent, or Firm* — Boyle Fredrickson, S.C.

(57) ABSTRACT

An animal water supply system includes disposable containers such as plastic bags that can be supplied in bulk in sterile form and filled under a change hood or other sanitary environment using a filling machine located in the sanitary environment. The containers preferably comprise plastic bags configured to be suspended from a hanger of a bag filling machine. The machine's hanger is preferably configured to support a plastic bag during both bag filling and the subsequent insertion of a watering valve into the bag. The bag is further configured to permit its placement in or on a conventional cage while protecting the tearable material of the bag from the animal. If desired, a liner can be provided to further protect and support the bag or other container on a wire bar lid.

29 Claims, 17 Drawing Sheets

U.S. PATENT DOCUMENTS

| | | | |
|---|---|---|---|
| D291,491 S * | 8/1987 | Larkin | D24/118 |
| 4,753,639 A * | 6/1988 | Iwatschenko | 604/246 |
| 4,830,205 A * | 5/1989 | Hammond et al. | 215/11.3 |
| 4,840,017 A * | 6/1989 | Miller et al. | 53/468 |
| D306,759 S * | 3/1990 | D'Alo | D24/118 |
| 5,007,232 A | 4/1991 | Caudill | |
| D323,389 S * | 1/1992 | Aoki et al. | D24/118 |
| 5,129,212 A | 7/1992 | Duffey et al. | |
| 5,322,095 A | 6/1994 | Bolz | |
| D354,129 S * | 1/1995 | Salvadori | D24/118 |
| 5,447,118 A | 9/1995 | Huff et al. | |
| 5,487,768 A | 1/1996 | Zytka et al. | |
| 5,572,953 A | 11/1996 | Phelan et al. | |
| 5,687,783 A | 11/1997 | Finnegan | |
| 5,853,247 A * | 12/1998 | Shroyer | 383/95 |
| 5,881,535 A | 3/1999 | Gliniecki et al. | |
| 5,947,170 A | 9/1999 | Poynter et al. | |
| 6,003,468 A | 12/1999 | Edstrom, Sr. et al. | |
| 6,039,720 A * | 3/2000 | Wieslander | 604/410 |
| 6,071,264 A * | 6/2000 | Castor | 604/183 |
| 6,076,968 A * | 6/2000 | Smith et al. | 383/202 |
| 6,098,676 A | 8/2000 | Poynter et al. | |
| 6,164,825 A * | 12/2000 | Larkin et al. | 383/104 |
| 6,237,654 B1 | 5/2001 | Sheyer | |
| 6,254,519 B1 * | 7/2001 | Toshima | 493/214 |
| 6,302,059 B1 | 10/2001 | Faith et al. | |
| 6,588,373 B1 | 7/2003 | Strzempko et al. | |
| 6,723,076 B1 * | 4/2004 | Strobel | 604/262 |
| 6,912,971 B1 * | 7/2005 | Chalk | 119/72.5 |
| 2001/0036326 A1 * | 11/2001 | Ichikawa | 383/67 |
| 2003/0103692 A1 * | 6/2003 | Taheri | 383/63 |
| 2003/0156766 A1 * | 8/2003 | Stefandl | 383/9 |
| 2003/0226515 A1 | 12/2003 | Gabriel et al. | |

OTHER PUBLICATIONS

*Fress H₂O Safe Simple Watering*, Arrowmight (6 pages).
Lab Products Inc., *Stay-Clean™ Workbenches* (1 page) (2002).
Tecniplast UK, Washing Division News, *Tunnel Vision* (1 page).

* cited by examiner

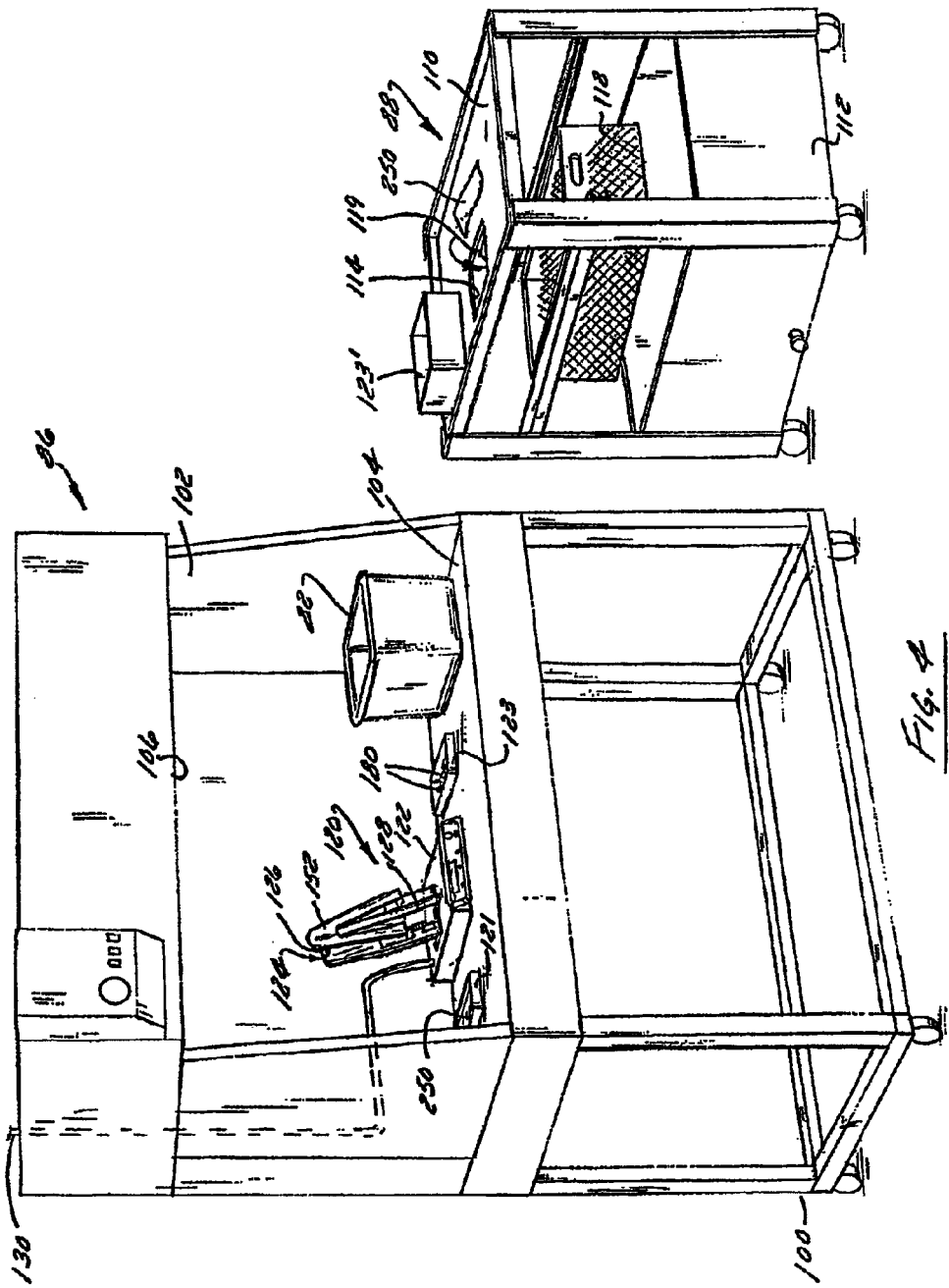

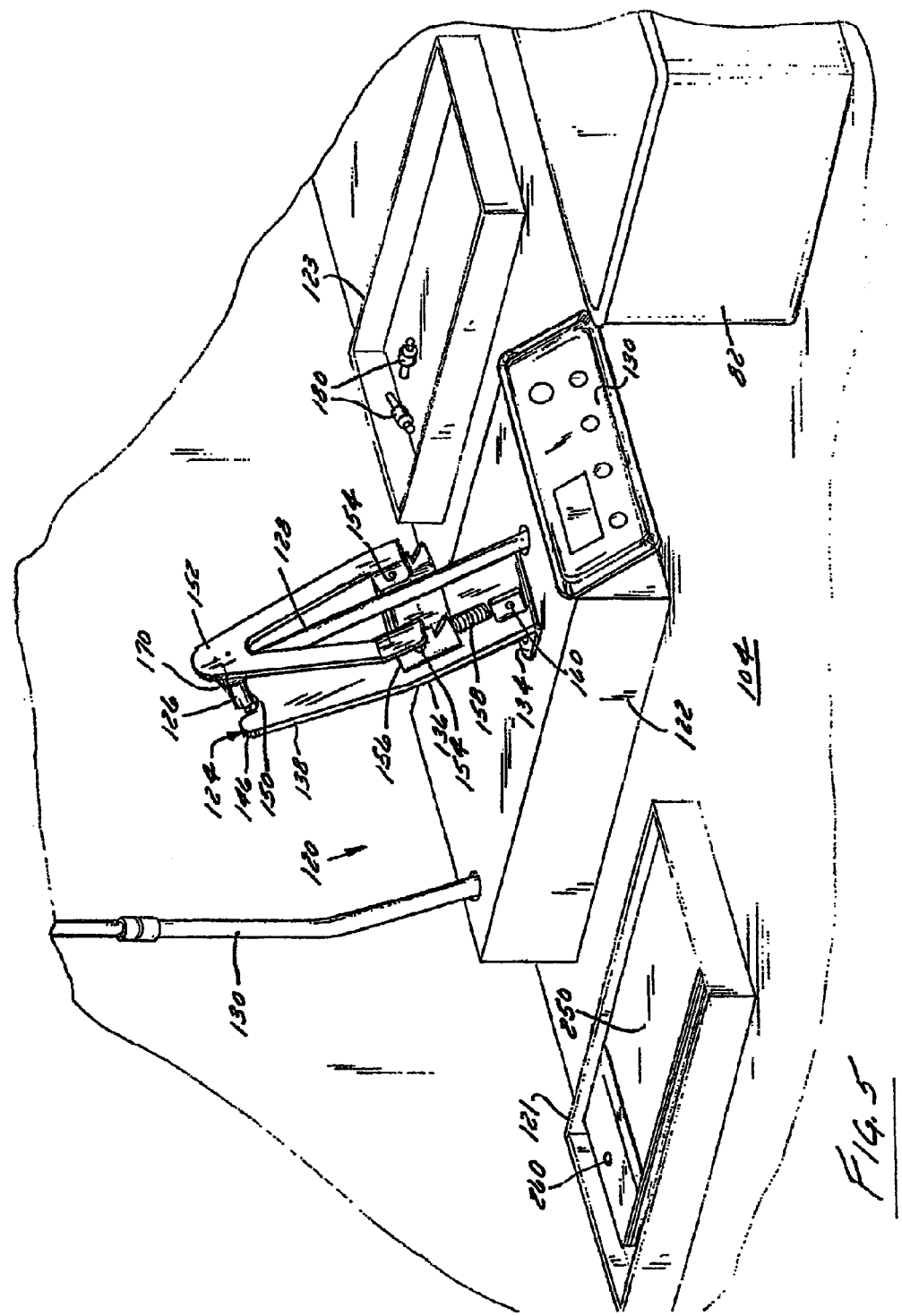

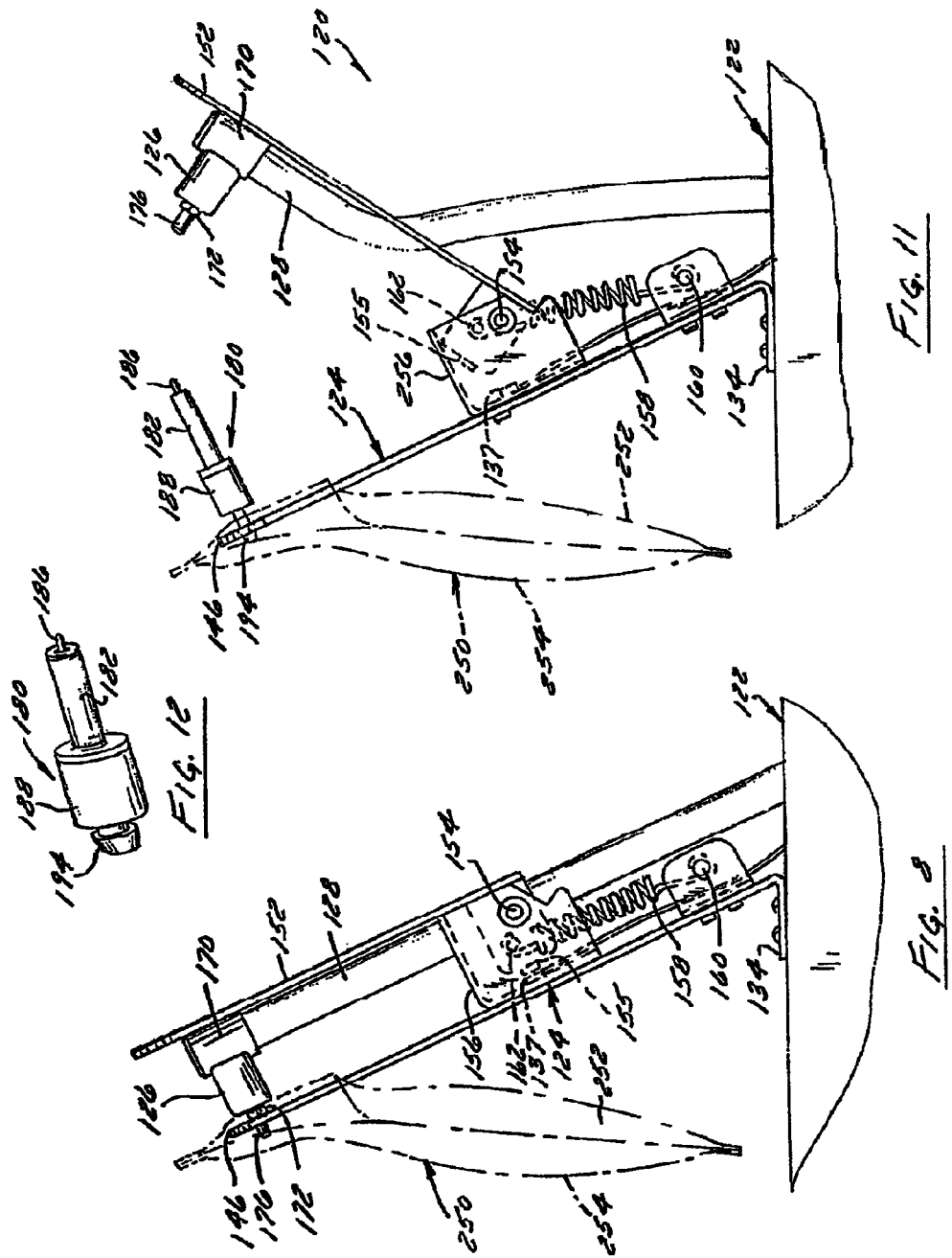

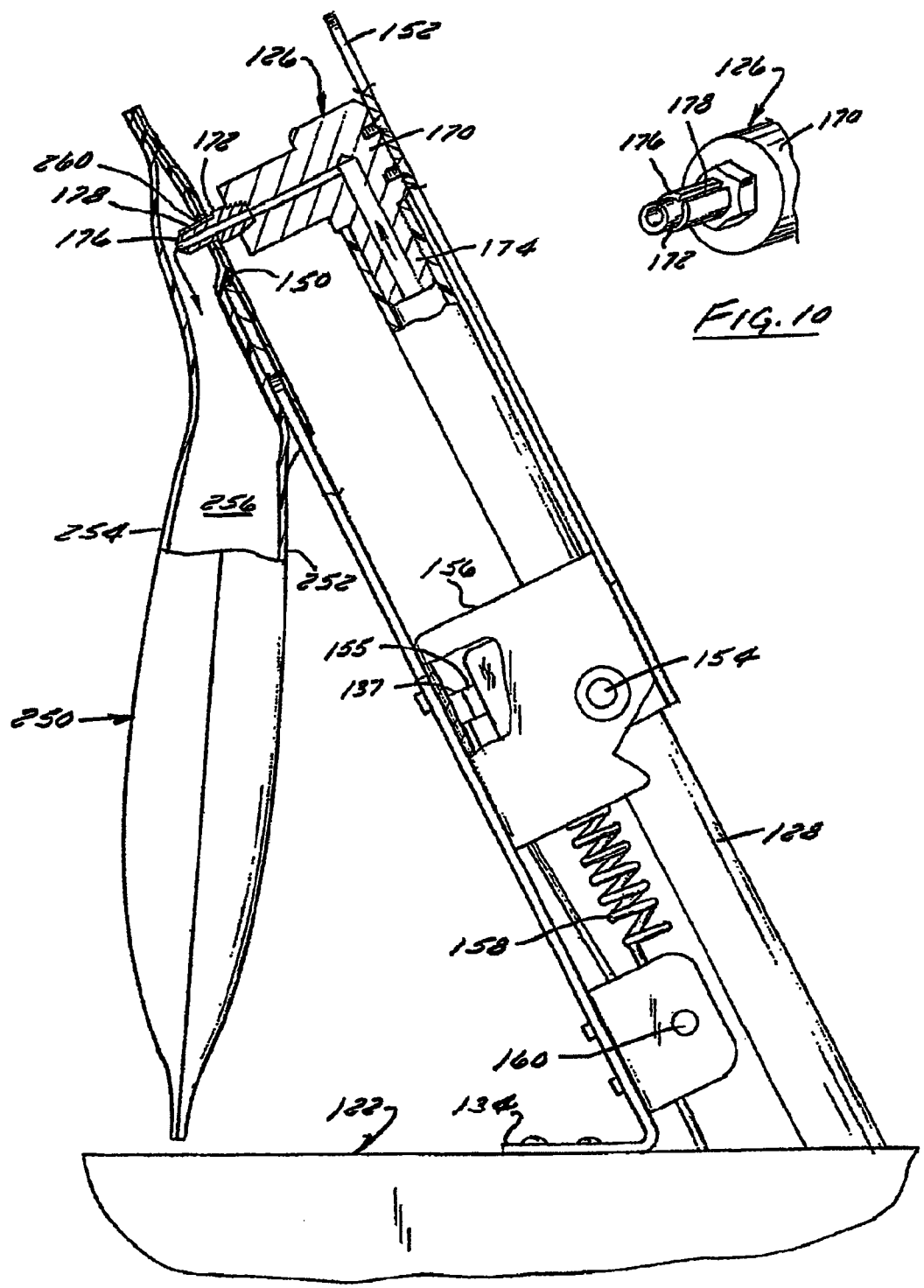

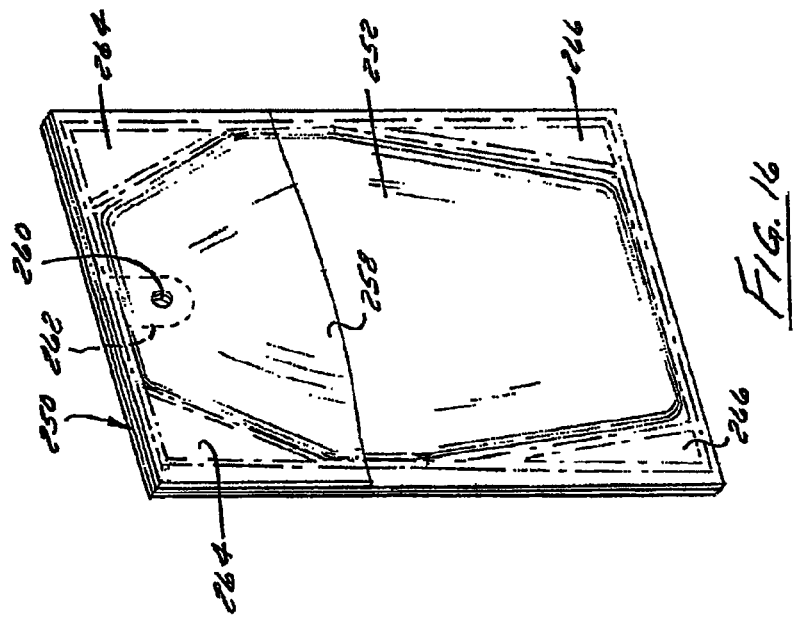
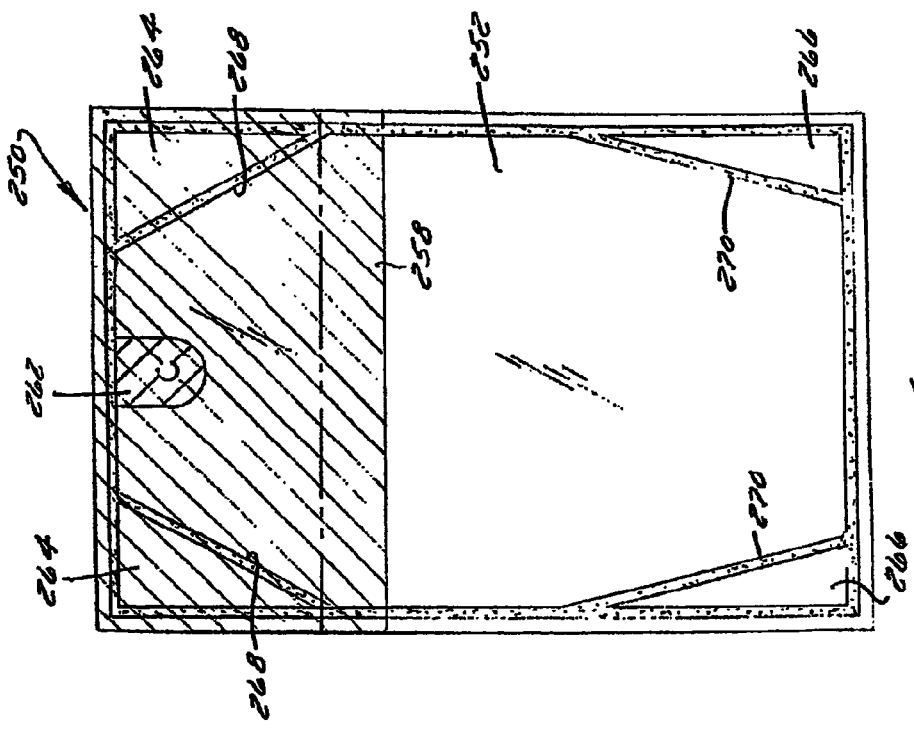

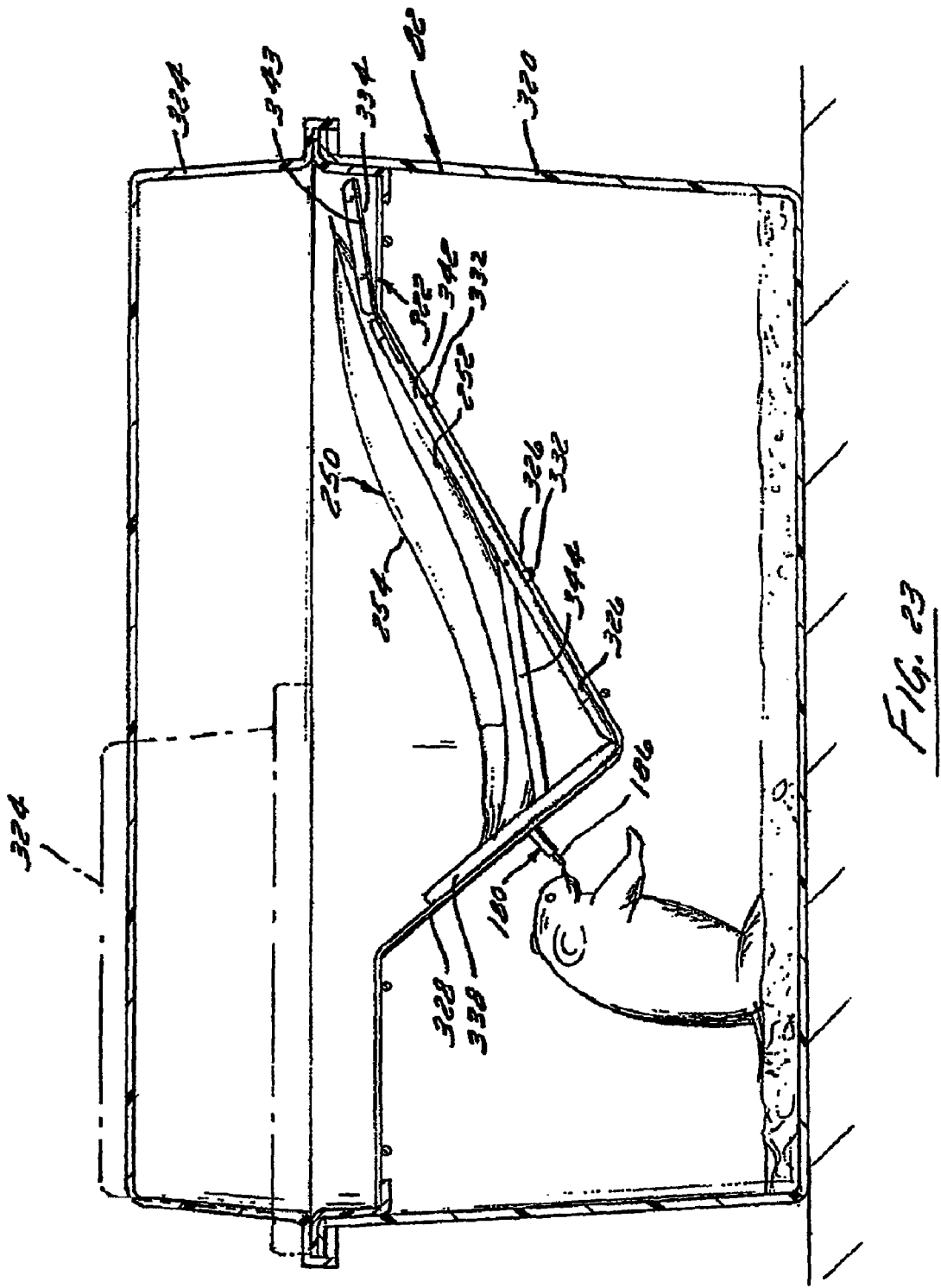

POTABLE WATER DELIVERY SYSTEM FOR ANIMALS

CROSS-REFERENCE TO RELATED APPLICATION

The present application is a divisional application of U.S. Ser. No. 10/940,282, filed Sep. 14, 2004, now U.S. Pat. No. 7,513,218 entitled "Potable Water Delivery System for Animals", the disclosure of which is incorporated herein in its entirety by reference.

BACKGROUND OF THE INVENTION

1. Field of the Invention

The invention relates generally to systems for delivering drinking water to animals and, more particularly, relates to a system and method for filling an animal watering bag in a sanitary environment and to a bag and a bag filling machine usable in such a system and method.

2. Discussion of the Related Art

A large and growing number of research facilities use lab animals in experimental research. These animals range in size from mice to non-human primates. The animals are typically housed in cages which may themselves be stored in rows on racks. Proper care of these animals is essential to these facilities. Infection, injury, or death to these animals is not only a loss of valuable animals but, perhaps worse, may also result in the loss of years of intensive research.

The cages for lab animals often form self-contained environments containing sources of food and water for the animals. In order to prevent the air in each cage from contaminating adjacent cages, the cages may be ventilated using a common air supply duct that supplies air to the cages, and a common exhaust manifold that draws air out of the cages, thereby leaving a slight positive pressure in the cages. The animals therefore remain isolated from one another to prevent the transfer of diseases. Systems of this type are disclosed, for example, in U.S. Pat. Nos. 5,954,013; 5,349,293; and 5,148,766, all of which are assigned to Lab Products, Inc. and all of which are incorporated by reference herein.

The cages on a particular rack may be supplied with drinking water either by individual water bottles or by a single water supply manifold connected to the individual cages by a plurality of animal watering valves, one of which is accessible by an animal in each cage. If water is supplied by a water manifold and animal watering valves, each cage may be coupled to both the air supply duct and the water supply manifold by a common docking assembly that extends into the rear wall of the cage. If, on the other hand, water is supplied by water bottles, each water bottle is self contained and simply rests on a wire bar lid disposed between a sealed plastic outer lid and the interior portion of the cage that houses the animal. In this case, a nipple or valve extends through the wire bar lid for access by the animal.

Water bottles are preferred over water manifolds by some facilities because, e.g., they require less piping than a facility having water manifolds. The major disadvantage of bottle-based systems is that substantial time and effort are required to clean, sterilize, fill, and reuse water bottles. The degree of effort required can be appreciated with reference to FIG. 1, which schematically illustrates a process for handling bottles in a bottle-based animal watering system. The process begins in an animal room 30 where empty or partially full contaminated bottles 32 are removed one at a time from the individual cages 34 on a rack 36 and placed in a basket 38 with other bottles 32. Each basket 38 typically contains 20 to 24 bottles.

Once the basket 38 is full, a spring loaded top (not shown) is snapped in place to hold the bottles 32 in the basket 38, and the basket 38 is placed in a cart 40. When the cart 40, which typically can hold 6-8 baskets, is full, it is wheeled into a separate wash area 42, as represented by arrow 44. Then, for each basket 38, the stoppers (not shown) are removed from the bottles 32, and the basket 38 is inverted and placed on the feed conveyor 48 of a machine 46 known as a "tunnel washer.". As the basket 38 is conveyed through the tunnel washer 46, the bottles 32 are cleaned through a cycle typically having pre-wash, detergent wash, acid rinse, cleanse rinse, and dry rinse phases. The basket 36 is then manually removed from the tunnel washer 44, turned back to its upright position, and stacked back on the cart 40.

After being filled with baskets of washed bottles, the cart 40 is wheeled to a bottle fill area 50 as represented by arrow 52, where the baskets 38 are fed one at a time through an automatic filling machine 54. The bottles 32 in the machine 54 are filled with plain water, treated water, or water containing nutrients or other additives. At the end of each fill cycle, clean stoppers are placed on the full bottles 32, and the full basket 38 is placed back on the cart 40.

Substantial manual effort is required for this and subsequent basket handling operations because the basket of full bottles typically weighs between 30 to 50 lbs. The degree of additional handling is application dependent. In less critical applications, a cart of full bottles can be transported directly from the fill area 50 back to the animal room 30. In other applications in which the animals are particularly fragile or in which contamination otherwise is of particular concern, the entire cart 40 and similarly filled carts are first placed in an autoclave 56 as represented by arrow 58 for sterilization, and only then is the cart 40 wheeled back into the animal room as represented by arrow 60.

In the animal room 30, bottles 32 are removed one at a time from the cart 40, sterilized manually using a spray bottle, and then placed in cages 34. This insertion takes place as part of a transfer process in which an animal is transferred from a soiled cage to a clean cage. The animal, food, and full water typically are placed in a clean cage in a type of change station usually known as a "change hood" 62, which constitutes a sanitary environment having a workbench which supports a clean cage during the transfer process. A typical change hood employs an appropriate filtering technique to isolate the air in the change hood from the air in the remainder of the room. For instance, the interior of the change hood 62 may draw air from the back of the change hood to an air intake on a front edge of the change hood's workbench. The air may be HEPA-filtered prior to being discharged back into the animal room 30. One such change hood is manufactured by The Baker Company of Sanford, Me.

Meanwhile, the soiled water bottle that is removed from the soiled cage during the change process is placed in a basket 38, perpetuating the cycle.

It should be apparent that the process described above is very time-consuming and labor intensive. It also can be very fatiguing given that a basket of full bottles can weigh from 30 to 50 lbs. It also is capital intensive, requiring the provision of a bottle washer, a fill station and, if desired, an autoclave. These expenses are all accrued in addition to those for the bottles and stoppers.

In addition, because the bottles 32 are filled outside of the animal room 30 in a non-sterile environment, the bottles may be contaminated, e.g., when filling the bottles, installing the stoppers, and/or transporting the filled bottles to the animal room.

In light of the foregoing, the need has arisen for an animal water supply system that requires less labor and less capital outlay than traditional bottle-based animal water supply systems.

Proposals have been made to eliminate at least some of the problems associated with handling glass or plastic water bottles by using plastic bags in at least some applications. For instance, U.S. Pat. Nos. 3,958,535, 4,022,159, and 4,130,088 to Salvia all disclose disposable plastic watering bags. However, rather than being configured to be filled on-site in an animal room, the bags are filled off-site and transported to the animal room in bulk. The transport of full bags to an animal room requires substantial manual effort and also substantially increases the risk of contamination.

More recently, published U.S. Patent Application Publication No. 2003/0226515 to Gabriel proposed a fluid delivery system in which disposable bags are formed and filled simultaneously using a so-called form fill and seal machine. The filled bags may then be sterilized after filling and/or handled in a change room or similar work station. However, the bags are not configured to be filled within a change hood or another sanitary environment in an animal room. Full bags must still be handled and transported at substantial manual effort and with substantial risk of contamination.

The need therefore has arisen to provide an animal water supply system that has a lower risk of contamination than a traditional bottle-based water supply system.

The need has also arisen to provide a disposable, sterile, easily handled water container that can be filled in a sanitary environment such as under a change hood.

The need additionally has arisen to provide a machine that could be mounted under a change hood or the like and that can automatically or manually fill a disposable animal watering container.

SUMMARY OF THE INVENTION

In accordance with one aspect of the invention, at least some of the above and other needs are satisfied by providing an animal water supply system including disposable containers such as plastic bags that can be supplied in bulk in sterile form and filled in an animal room, possibly under a change hood or other sanitary structure using a filling machine. The containers preferably comprise plastic bags configured to be suspended from a hanger of a bag filling machine. The machine's hanger is preferably configured to support a plastic bag during both bag filling and the subsequent insertion of a watering valve into the bag. The bag is further configured to permit its placement at a conventional cage while protecting the tearable material of the bag from the animal. If desired, a cage liner can be provided to further protect and support the bag. The cage liner may have a flip down shelf to facilitate stacking.

The bag filling machine may be operated either manually or automatically and could take many physical forms so long as it is capable of fitting under the change hood or another sanitary environment of interest. It preferably contains an integrated container support mechanism and has a nozzle that is configured to align with or form a hole in the bag or other container supported on that mechanism. The nozzle preferably is also movable into and out of position so as to permit an animal care person to install a valve in a bag after it is filled. The filling machine may also be configured to turn on automatically upon insertion of the nozzle into the bag. It may also be configured to shut off automatically based, e.g., on the weight of the bag. To this end, the filling machine may have an integral scale. Such a scale may be either electronic or mechanical. It is configured to interact with a mechanical or electronic controller to shut off the flow of water to the nozzle when a designated volume of water has been dispensed into the bag. This designated volume preferably is settable using a suitable controller such as a dial or touch buttons on a panel. Alternatively, a mechanical or electrical timer could be used to terminate dispensing after a designated period of time elapses that is indicative of a correspondingly designated volume of dispensed water.

The preferred container comprises a preformed plastic bag. In order to negate the need to provide a piercing structure on filling machine's the fill nozzle, the bag preferably has a preformed hole for receiving the fill nozzle and, subsequently, a watering valve. The bag may have an integrated pouch for hanging on a hanger of a bag filling machine. It also is preferably reinforced at several locations to (1) facilitate handling, (2) inhibit puncturing of water-filled portions of the bag by an animal, and (3) cooperate with the hanger of a bag filling machine to align the hole with the fill nozzle and stabilize the bag during bag filing and valve insertion.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 4 is an enlarged perspective view of the water supply system of FIG. 3;

FIG. 5 is an enlarged perspective view of a bag filling machine, bag storage carton, and a watering valve storage bin of the system of FIG. 4;

FIG. 6B is a somewhat schematic perspective view of a bag filling machine constructed in accordance with still another embodiment of the invention;

FIG. 8 is a side elevation view of the bag filling machine, showing the filling of a bag;

FIG. 9 is an enlarged view of a portion of FIG. 8, showing a fill nozzle of the filling machine in cut away;

FIG. 10 is a fragmentary enlarged view of the fill nozzle of the bag filling machine;

FIG. 11 corresponds to FIG. 8 and illustrates the fill nozzle in a stowed position and the insertion of an animal watering valve into the bag;

FIG. 12 is a perspective view of the animal watering valve of FIG. 11;

FIG. 16 is a perspective view of a bag usable with the water supply system of FIGS. 2-13;

FIG. 17 is a rear elevation view of the animal watering bag of FIG. 16;

FIG. 23 is a side sectional view illustrating use of the animal watering bag of FIGS. 16-17A by a mouse housed in the cage.

DETAILED DESCRIPTION OF THE PREFERRED EMBODIMENTS

An animal water supply system constructed in accordance with a preferred embodiment of the present invention is characterized by the use of a disposable container such as a bag rather than a reusable water bottle and by the ability to fill that container in a sanitary environment in an animal room of a laboratory or similar facility. The containers of the illustrated embodiment comprise bags and are filled under a change station in the form of a mobile hood.

1. System and Process Overview

Figure 1:
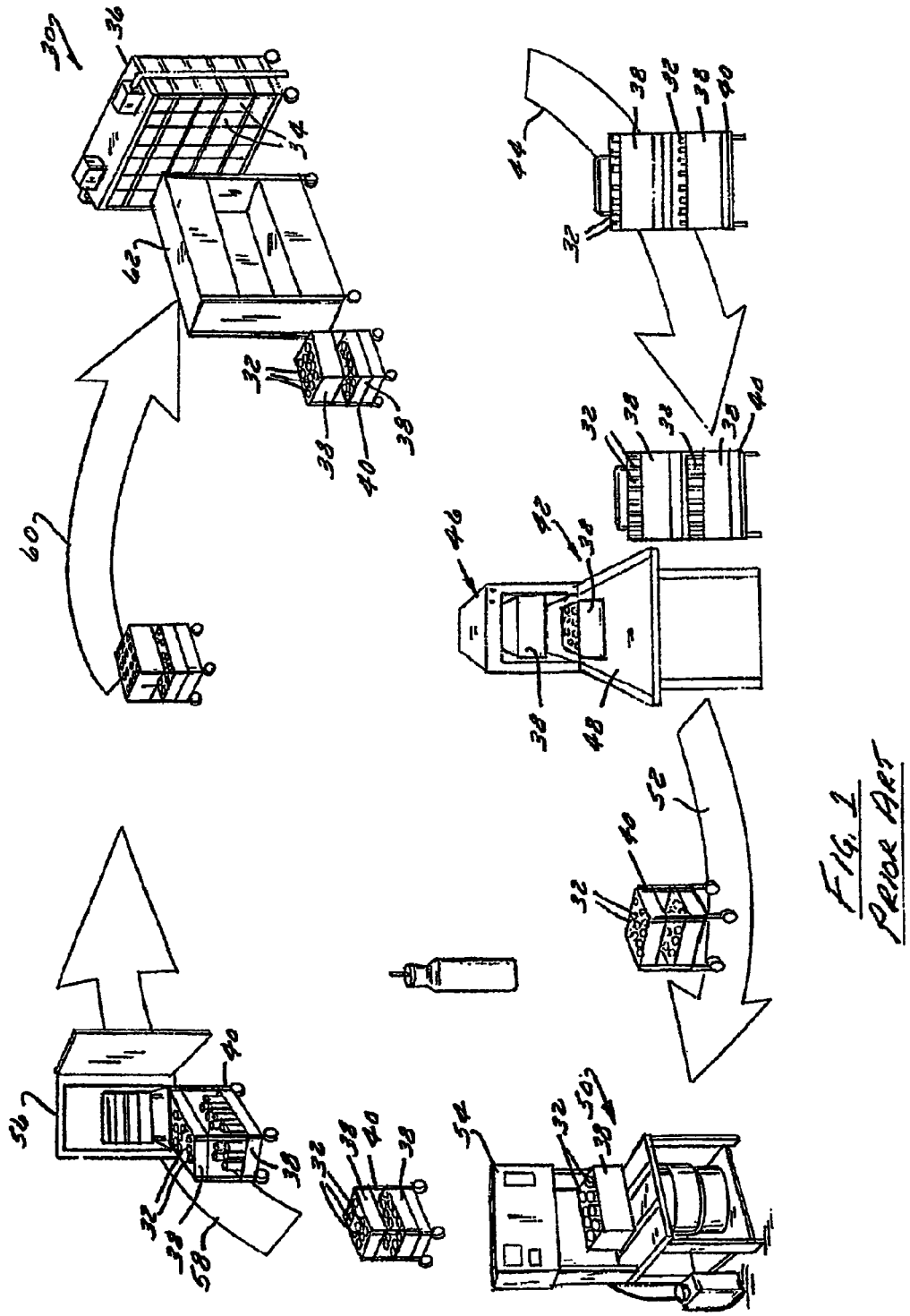
FIG. 1 schematically illustrates a process for supplying water to animals in a conventional water bottle-based water supply system and is appropriately labeled "PRIOR ART;"
Figure 2:
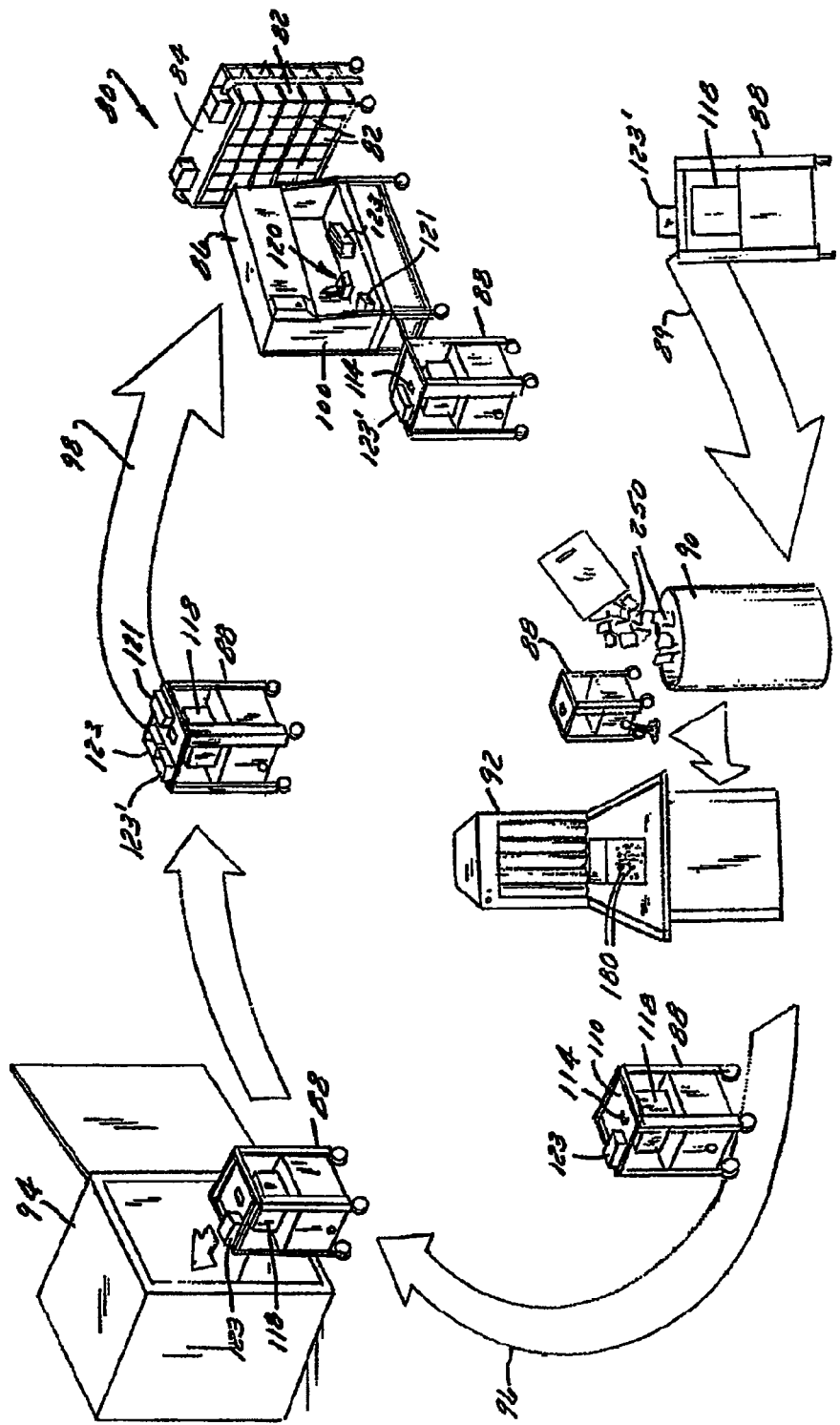
FIG. 2 schematically illustrates a process for supplying water to animals in a bag-based water supply system constructed in accordance with a preferred embodiment of the present invention.

Referring to FIG. 2, the process of supplying water to the animal cages using this system begins in an animal room 80 where cages 82 are stored on racks 84 in the usual manner. Also, as is typical, animals are transferred from soiled cages to clean cages under a change hood 86. Soiled or used bags 250 are removed from the cages 82 as part of the process. Watering valves 180 are removed from the bags 250 and stored in a bin 123' on a bag handling cart 88, the soiled bags 250 are dropped into a soiled bag collection basket on the bag handling cart 88, where the water drains into a water collection tank below the basket. The container and bin are large enough to receive all used bags 250 and valves 180 from the cages processed in one day in the room 80.

The cart 88 is then wheeled out of the animal room (see arrow 89), 80 where the used bags 250 are discarded in a suitable receptacle 90, and watering valves 180 are cleaned in a cleaning machine 92 in a conventional manner. The cleaned valves 180 are then placed back on the cart 88. If necessary, the cart 88 is transferred to an autoclave 94 for sterilization as represented by arrow 96. A bulk package 121 of sterile bags 250 is then placed on the cart 88, and the cart 88 is wheeled back into the animal room 80 as seen by arrow 98. The bulk package 121 of bags is then removed from the cart 88, externally sanitized if desired, then placed under the change hood or on another work surface in the animal room. Bags 250 are then removed from the package 121 one at a time and filled by a filling machine 120 on the work surface as described below. The water may be plain tap water, filtered water, or water supplemented with nutrients and/or a biocide. A clean valve 180 is installed in the full bag 250, the bag is then placed in a cage 82, and the process is repeated.

Figure 3:
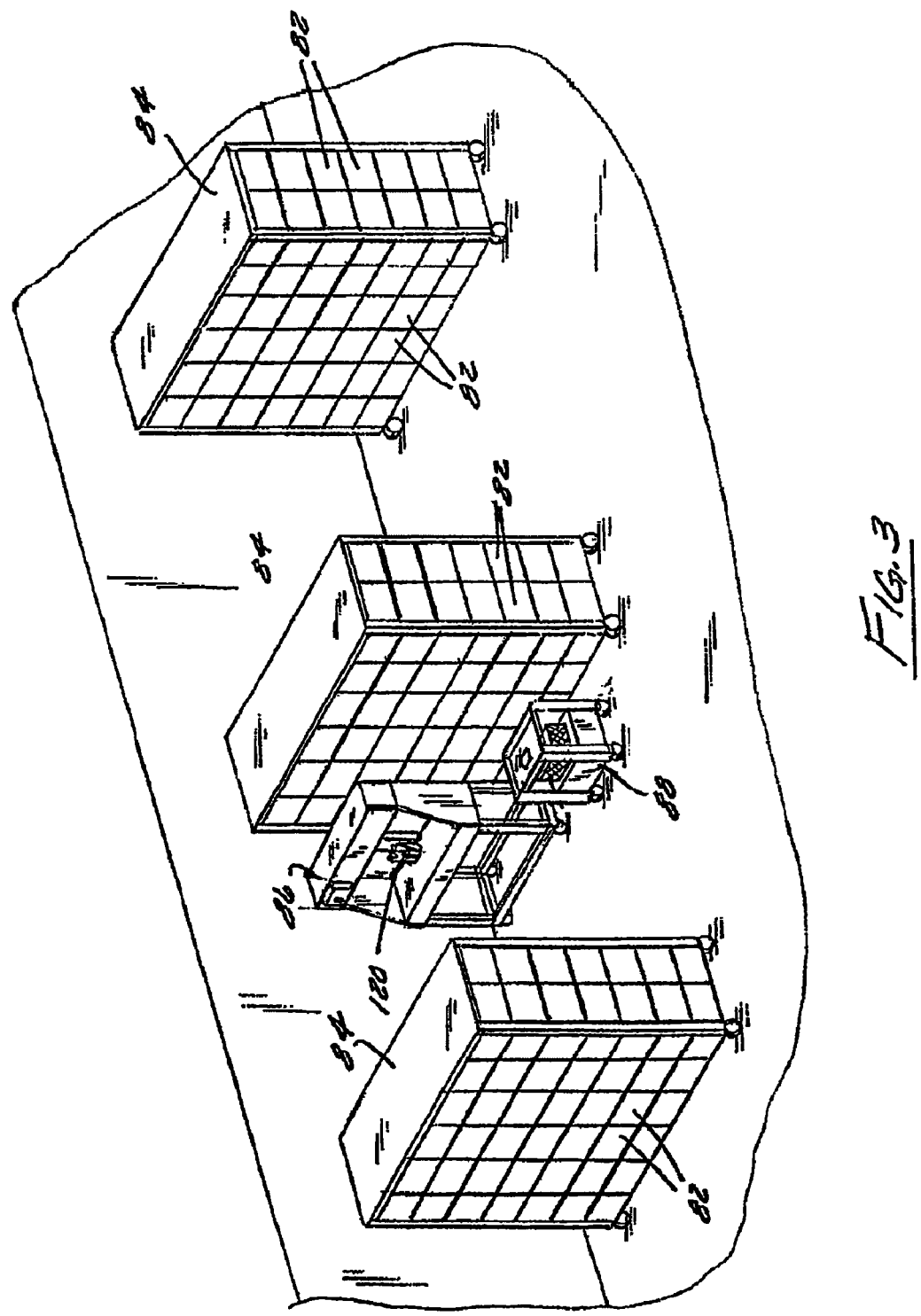
FIG. 3 is a somewhat schematic perspective view of a portion of an animal room having disposed therein a cage and rack system and a bag-based water supply system constructed in accordance with the present invention.
Figure 7:
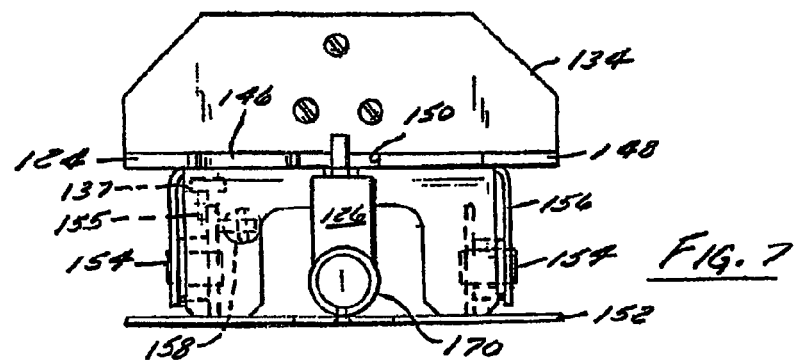
FIG. 7 is a top plan view of the bag filling machine of FIG. 6.

The change hood 86 is illustrated in more detail in FIGS. 3-5, along with a cart 88 and a filling machine 120 constructed in accordance with a preferred embodiment of the invention. Referring to FIG. 4, the change hood 86 is a conventional change hood manufactured, for instance, by The Baker Company. The change hood 86 takes the form of a wheeled cart 100 having a HEPA-filtered interior 102 bordered by a lower shelf 104 and an upper hood 106. The cart 100 may be coupled to an external power source and/or to a source of potable water. It should be noted that the change hood 86 could take many configurations as currently supplied by many manufacturers so long as it provides an internal environment that is sufficiently sanitary for the intended application. It could also be replaced by another stationary or mobile change station or some other sanitary environment entirely.

Referring especially to FIG. 4, the bag handling cart 88, though in no way essential to the water supply system, forms a convenient vehicle for transferring bags 250 and valves 180 to and from the animal room 80. It comprises a simple wheeled chart having an upper platform 110, a soiled bag collection basket 118, and a lower waste water collection tank 112. An opening 114 is formed in the upper platform 110 over the bag collection basket 118.

The space beside the opening 114 is sufficiently large to support two bins of watering valves and a bulk package of sterile bags (not shown in FIG. 4). A tank 112 is located below the basket 118 to collect the water drained from the soiled bags. The handling cart 88 may also have a mechanism 119 for tearing the bag before dropping into the bag collection basket 118 to provide faster, more complete draining of water from the soiled bag. The tearing mechanism may, for example, comprise a stationary blunt blade as shown. It could also be located on a hinged pivoting trap door that covers the opening 114. The bag can be snagged and torn on the pivoting blunt blade before falling through the trap door into the collection basket 118. It could also comprise a spring loaded sliding plate that has a blunt blade and that can be driven into a bag held in the opening 114 and then allowed to return to its open position under the force of a return spring to let the bag fall into the collection basket 118 when the bag is released.

2. Bag Filling Machine

A bag filling machine 120 is supported on the change hood shelf 104 in a location that is accessible by an animal care person whose job it is to fill bags 250, insert watering valves 180 in the bags, and place the bags 250 in clean cages 82 during a change operation. Referring to FIGS. 4 and 5 in the illustrated embodiment, the bag filling machine 120 is located so as to permit the placement of a carton 121 of clean bags and a bin 123 of sterile watering valves 180 on the shelf 104 adjacent the bag filling machine 120 while still leaving sufficient shelf space to support cages during a change process. The filling machine 120 could be operated either manually or automatically and could take many physical forms so long as it is capable of fitting under the change hood 86 and filling a bag or other disposable container. It could be configured to fill a single bag or multiple bags simultaneously. It preferably contains an integrated container support mechanism and has a nozzle that is configured to align with or form a hole in the bag or other container supported on that mechanism. The nozzle preferably is also movable into and out of its operative position so as to permit an animal care person to install a valve in a bag after it is filled. The filling machine of this embodiment is also configured to turn on automatically when the nozzle moves into its operative position. It is also configured to shut off automatically based, e.g., on the weight of the bag and, to this end, may have an integral scale. The scale may be either electronic or mechanical. It is configured to interact with a mechanical or electronic controller to shut off the flow of water to the nozzle when a designated volume of water has been dispensed into the bag. This designated volume preferably is settable using a suitable controller such as a dial or touch buttons on a panel. Alternatively, a mechanical or electrical timer could be used to terminate dispensing after a designated period of time elapses that is indicative of a correspondingly designated volume of dispensed water.

Referring to FIGS. 5-8, the filling machine 120 of this embodiment comprises a base 122, a scale mounted on the base 122, a hanger 124 mounted on the scale, and a dispensing nozzle 126. The dispensing nozzle 126 receives water from a supply tube 128 extending upwardly from the base 122 in front of the hanger 124. Water is supplied to the machine from a line 130 mounted on the change hood 86. Controls and displays are located on a front panel 130 on the base 122, or can be optionally located remotely, to permit the operator to perform operations such as turning the machine 120 on or off, initiating a fill cycle, and setting the weight/volume for automatic shutoff. At least some of these controls can be supplemented by or replaced with a nozzle presence detector such as a proximity detector such as discussed below.

Referring to FIGS. 5-9, the hanger 124 preferably is shaped so as to securely hold a bag 250 of the preferred embodiment in place during a fill cycle while providing access to the bag 250 for insertion of the fill nozzle 126 and, subsequently, a watering valve 180. The hanger 124 of this embodiment comprises a bent metal plate having a first, horizontal leg 134 secured to the scale on the base 122 and a second leg 136 extending upwardly from the base 122. The second leg 136 may extend vertically from the base 122 or, as illustrated in the embodiment, may extend rearwardly at an acute angle of, e.g., 25°. It has been found that inclining the second leg 136 in this manner permits the dispensed water to be injected downwardly into the bag 250 as opposed to against the rear surface of the bag, hence facilitating bag filling without splashing or gurgling. The second leg 136 has a tapered upper portion 138 terminating at a pair of rounded lobes 146 and 148 that flank a central curved notch 150. The lobes 146 and 148 are configured to engage features in the bag 250 to center a hole 260 in the bag within the notch 150 and to stabilize the bag 250 during the filling and valve insertion operations. A nozzle support arm 152 is pivotally attached to the front surface of the second leg 136 by pins 154. The pins 154 are, in turn, mounted on a bracket 156 having a front surface that also acts a stop for the support arm 152. The support arm 152 is biased toward the operative position of FIG. 5 by a tension spring 158 having a first end attached to a spring seat 160 on the second leg 136 and a second end attached to a spring seat 162 on the support arm 152.

In addition to or instead of being initiated by activation of a manual switch, the filling cycle may also be started and/or stopped based on signals from a proximity switch 137 on the hanger 124 that is responsive to a magnet 155 on the support arm 152. Specifically, the switch 137 could eliminate the need to actuate a manual ON switch by triggering the dispensing of water into a bag when the arm 152 swings into its operative position. It could also terminate the flow of water into a bag when the arm 152 swings into its stowed position.

As best seen in FIGS. 9 and 10, the nozzle 126 comprises a body 170 and a dispensing nipple 172. The body 170 is attached to the support arm 152. A reduced diameter inlet portion 174 extends downwardly into the upper end of the supply tube 128. The dispensing nipple 172 is threaded into an opening on the front surface of the body 170. The dispensing nipple 172 may have a pointed front end (not shown) so as to permit the nozzle to puncture the bag and permit the filling of bags lacking preformed fill holes. A slit sleeve 176 or the like is threaded onto the outer end of the dispensing nipple 172 so as to provide an air channel 178 through which air may bleed from the bag 250 during a filling operation.

Figure 6:
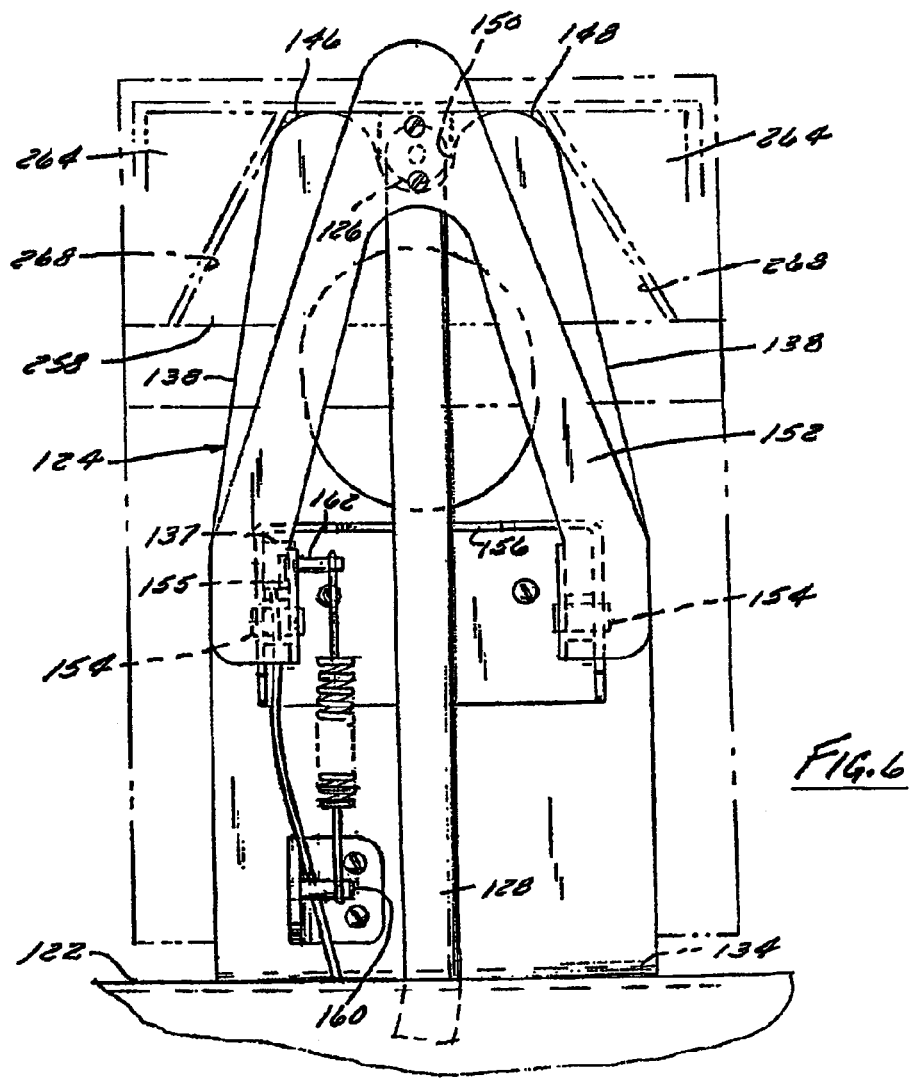
FIG. 6 is a front elevation view of a portion of the bag filling machine of FIG. 5, showing a bag to be filled in phantom lines.
Figure 6A:
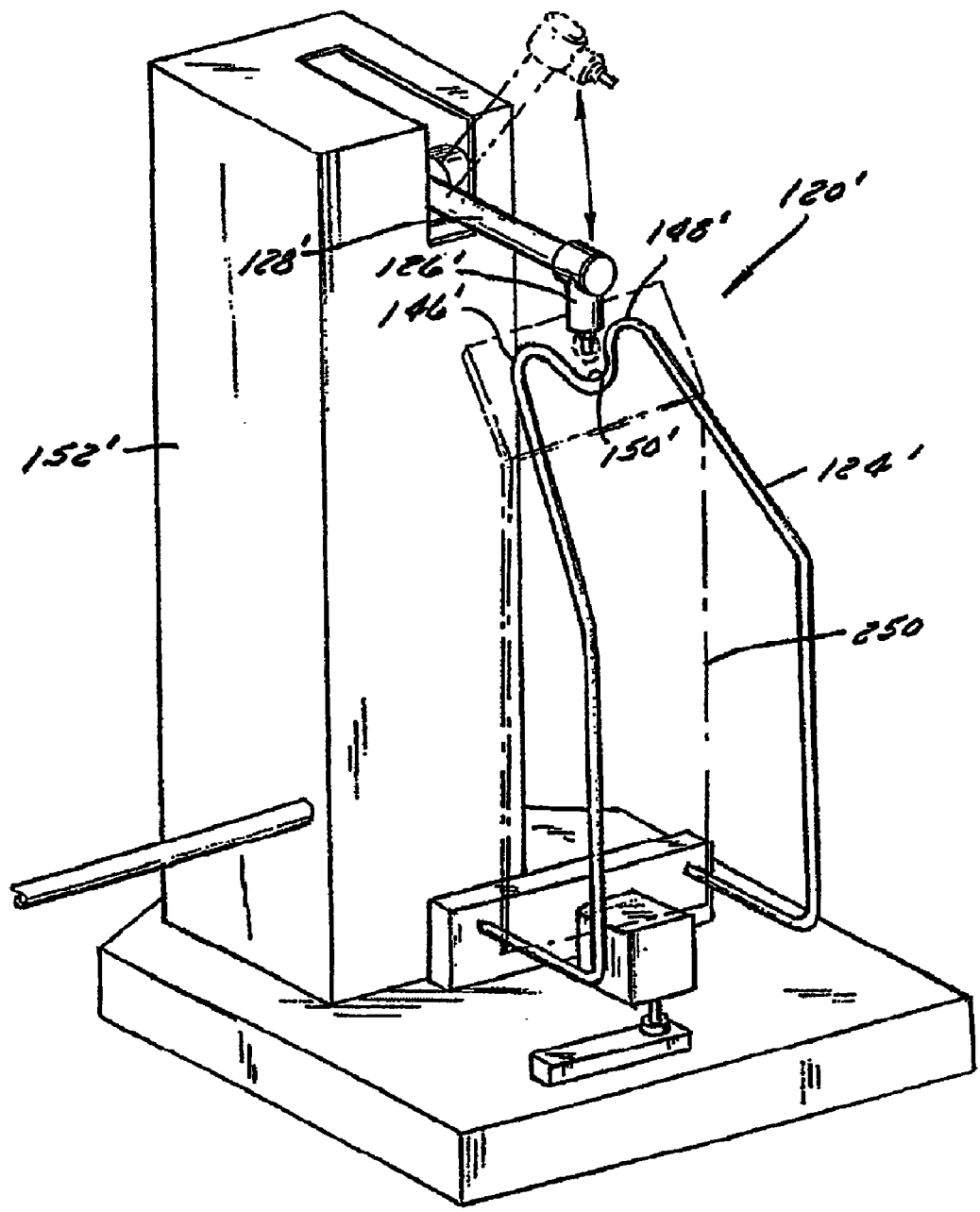
FIG. 6A is a somewhat schematic perspective view of a bag filling machine constructed in accordance with another embodiment of the invention.
Figure 68:
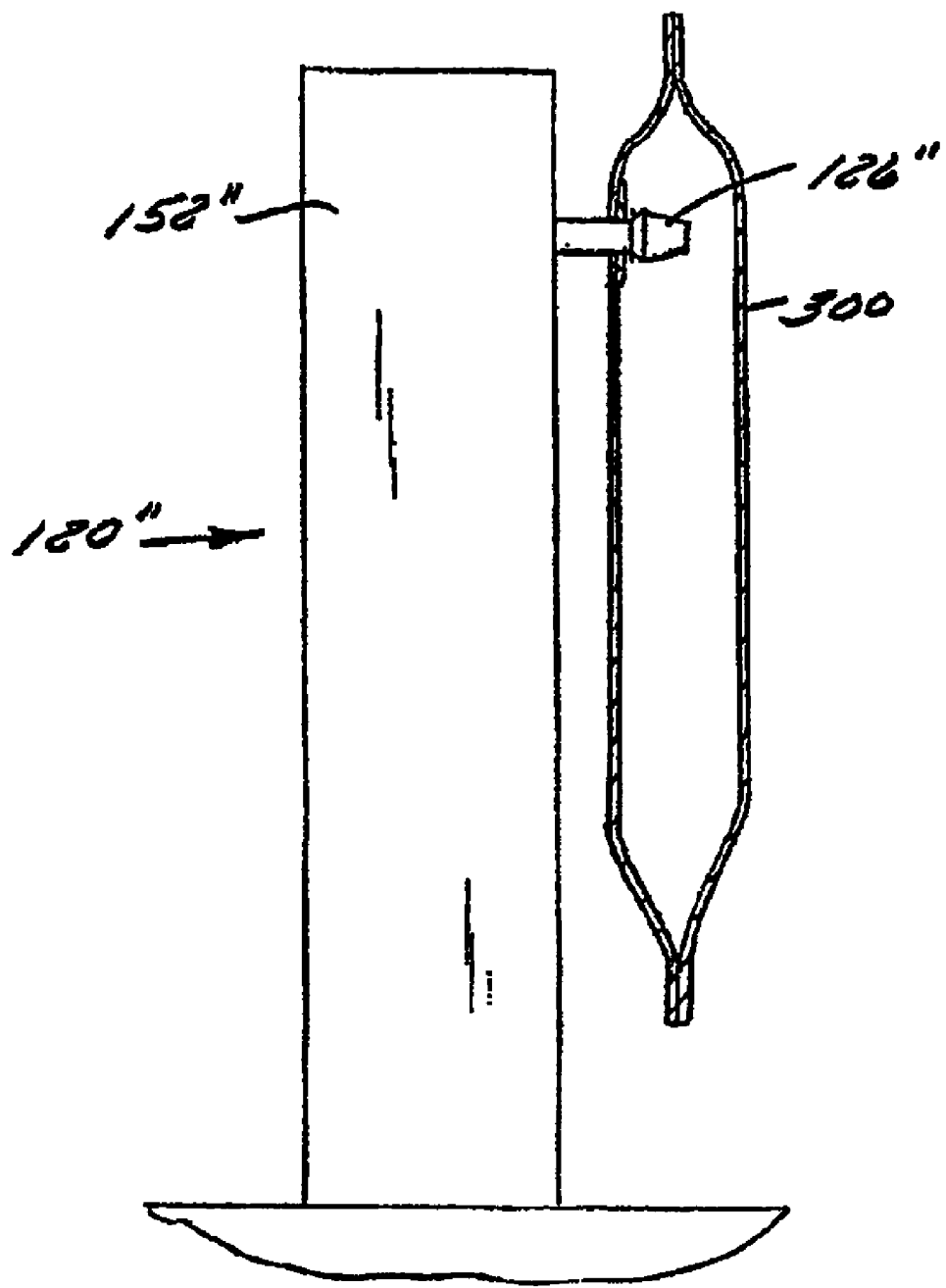
Figure 19:
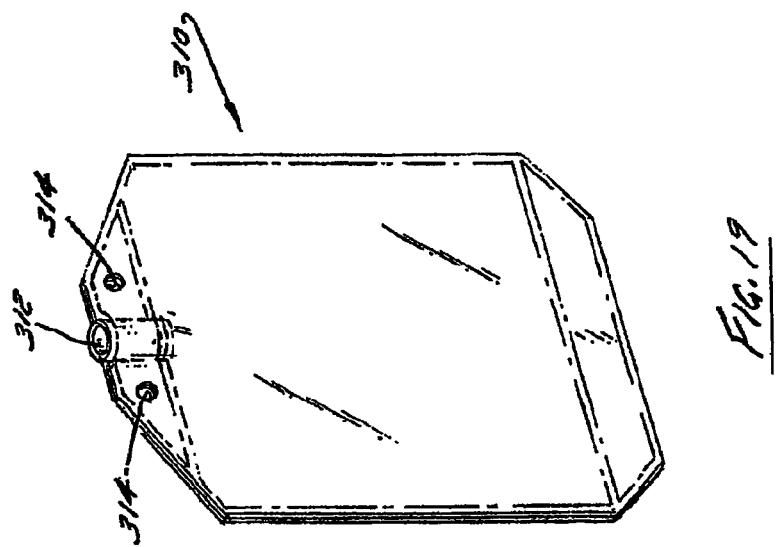
FIG. 19 is a perspective view of a watering bag constructed in accordance with yet another embodiment of the invention.
Figure 18:
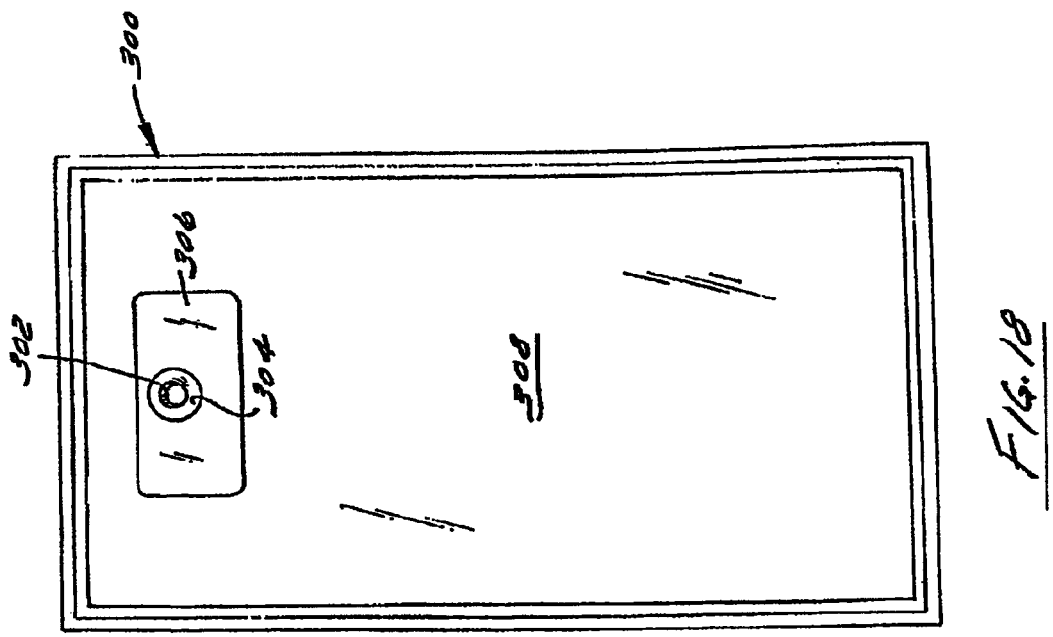
FIG. 18 is a front elevation view of a watering bag constructed in accordance with an alternative embodiment of the invention.

Of course, the filling machine 120 could take many forms other than thus far described. As an example, the plate-type hanger 124 could be replaced with a wire form as illustrated in FIG. 6A. The upper end of the wire form 124' of this machine 120' is bent to form spaced lobes 146' and 148' and a center notch 150' having the same shape as the corresponding structures in the plate of the embodiment of FIG. 6. The remainder of the filling machine 120' is also shown as being modified to demonstrate that the filing machine also need not take the form illustrated in FIGS. 5-9. For instance, the nozzle 126' is mounted on a tube 128' pivotally mounted on a tower 152'. In another variation, shown in FIG. 6B, the hanger of the filling machine 120" is eliminated altogether, and a grommeted bag, examples of which are described below in conjunction with FIGS. 18 and 19, is hung directly from the nozzle 126". The nozzle of this embodiment is mounted on a rigid plate 152''' as opposed to a pivoting mounting arm.

3. Watering Valve

Figure 13:
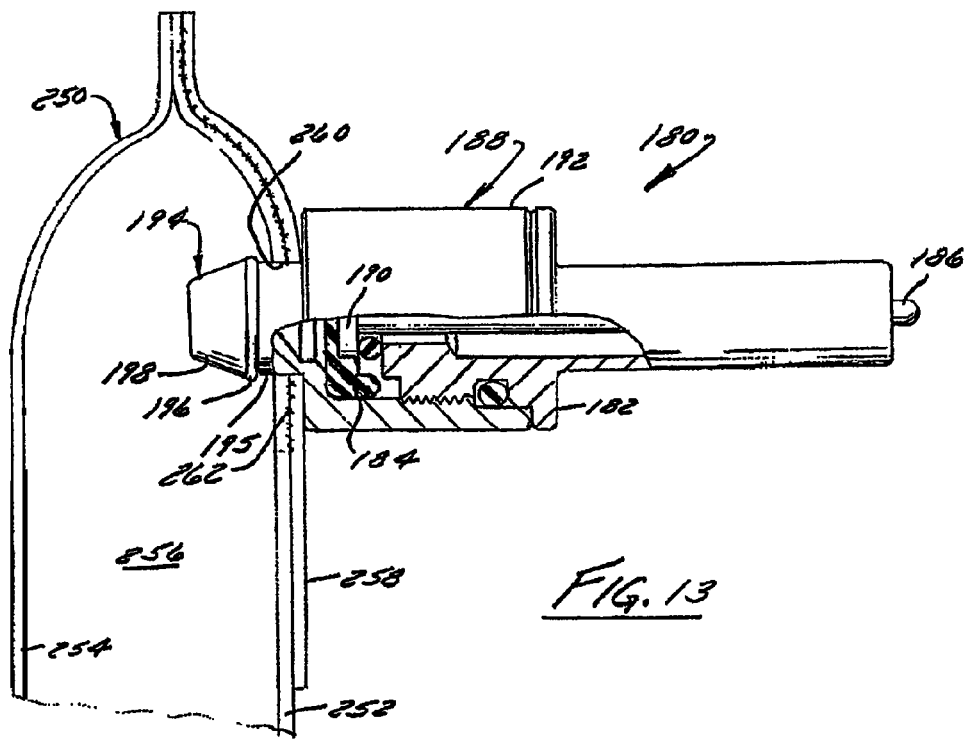
FIG. 13 is a partially cut-away side elevation view of the animal watering valve of FIG. 12, after the valve has been inserted into a bag.

A watering valve 180 suitable for insertion into a bag 250 while it is mounted on a filling machine 120 is illustrated in FIGS. 12 and 13. The valve 180 is very similar to that disclosed in U.S. Pat. No. 6,003,468 to Edstrom et al., the contents of which are incorporated herein by reference. It includes as its principal components a housing 182, an internal valve element 184, a valve stem 186, and a barbed rear valve cap 188. The valve element 184 comprises an elastomeric diaphragm which normally seals against a head 190 of the valve stem 186 and which, upon valve stem deflection by an animal, deforms to permit water to flow through the valve 180. A preferred valve element is disclosed in more detail in the Edstrom '468 patent. The cap 188 is threaded onto the exterior surface of the housing 182. It includes a rear cup portion 192 and a barbed front shank 194. The shank 194 includes a reduced diameter neck 195 and a barb. The barb includes an annular shoulder 196 disposed at the front end of the shank 194 and a frusto-conical tapered portion 198 extending forwardly from the shoulder 196. When the shank 194 is inserted into a preformed hole in the bag 250, the frusto-conical portion 198 guides the shank 194 into the hole 260 and then expands the hole as the shoulder 196 approaches it. Then, after the shoulder 196 is inserted into the bag, the perimeter of the bag's hole 260 seals against the neck 195 to prevent water from leaking out of the bag 250. Shoulder 196 prevents the valve 180 from being pulled easily out of the bag 250.

4. Water Supply System

Figure 14:
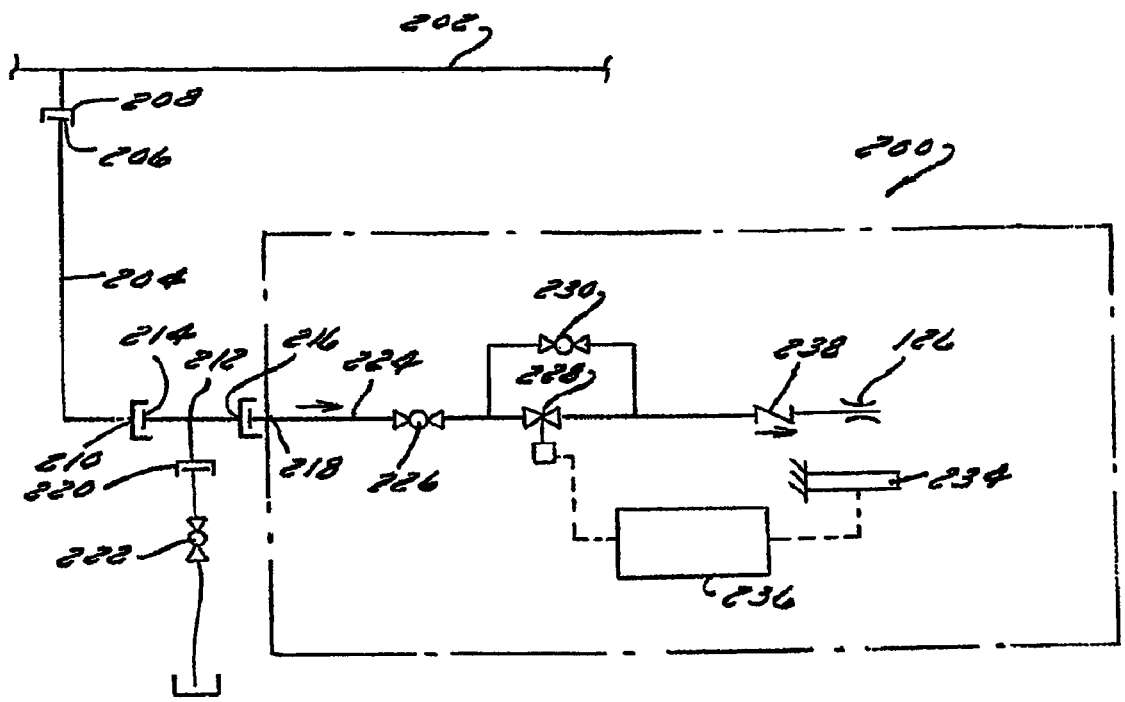
FIGS. 14 and 15 schematically illustrate two systems for supplying water to the fill machine of FIGS. 2-9.
Figure 15:
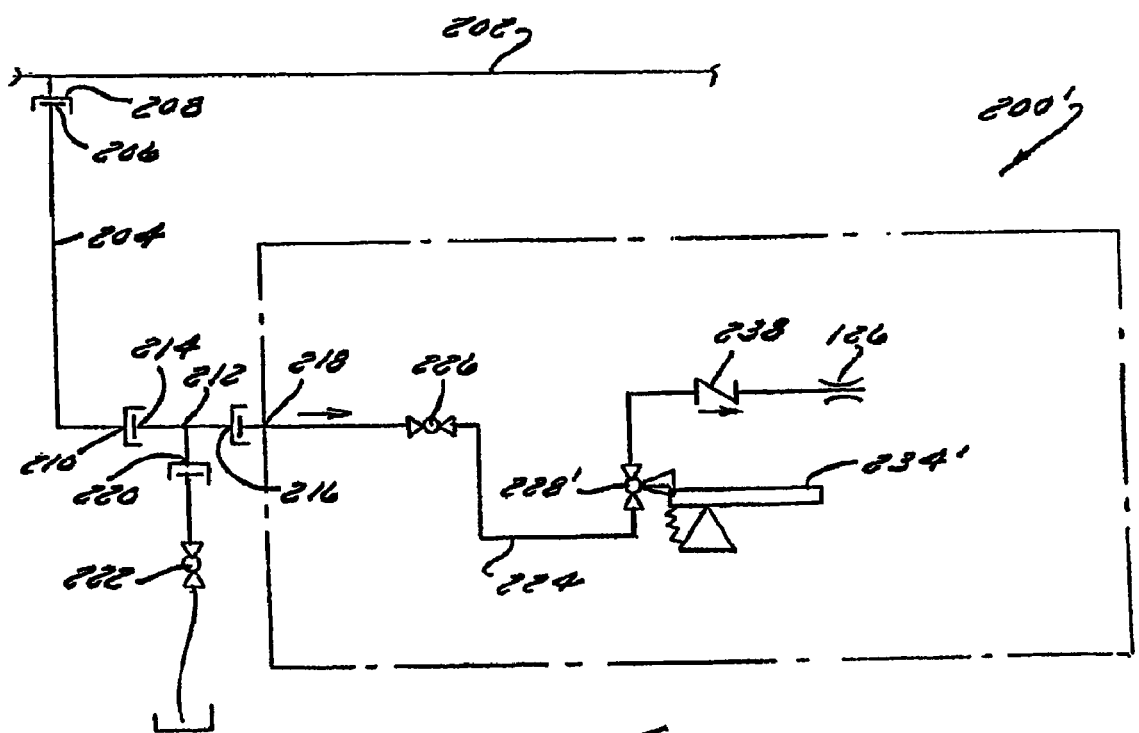

Two possible systems 200, 200' for supplying water to the filling machine 120 are schematically illustrated in FIGS. 14 and 15, respectfully. Both systems may supply plain tap water, filtered water, or water supplemented with nutrients. The water may also contain a biocide, particularly if the flexible containers to be filled lack sanitized interiors. The system 200 of FIG. 14 is controlled electronically, whereas the system 200' of FIG. 15 is controlled mechanically. Both systems are designed for connection to a conventional water room distribution system as represented by a supply line 202. The distribution system preferably has fittings spaced around the room so that a relatively short hose, such as a six foot coiled hose, can reach any location in the room if plugged into the appropriate fitting. Although only a single supply line 202 is shown, a return line could also be provided, in which case the hose would be connected to a manifold connecting the supply and return lines to permit periodic flushing of the entire system.

Referring first to FIG. 14, the system 200 includes a hose 204 having an inlet 206 attached to the line 202 by a fitting 208 and an outlet into a T-fitting 212 on the back of the change hood 86. One outlet 216 of the T-fitting 212 opens to a port 218 on the bag filling machine 120. The other outlet 220 is connected to a drain valve 222. The drain valve 222 may be controlled automatically or manually to permit the operator to flush the hose 204 periodically in order to provide fresh water to fill the bag 250. Flushing typically will occur at the beginning of each day. Located within the filling machine 120 is a line 224 extending from the port 218 to the bag filling nozzle 126. A manual on/off valve 226 and a solenoid valve 228 are disposed in series in line 224. A manual bypass valve 230 is also provided in parallel with the solenoid valve 228. The solenoid valve 228 is energized by pushing the start switch or through the proximity switch 137 (FIG. 8) or by operation of a foot switch (not shown). An electronic load cell 234 within the machine's scale transmits signals to a controller 236 that close the solenoid valve 228 to shut off the flow of water through the line 224 when a predetermined weight of water has been dispensed into a bag 250. That volume is settable using controls on the panel 130. The manual on/off valve 226 and the manual bypass valve 230 can be operated together to flush the line 224 or to allow the unit to be manually controlled when filling a bag. Finally, an antidrip valve 238 is provided adjacent the nozzle 126 to assure smooth, instantaneous termination of water flow upon closure of the solenoid valve 228.

In the embodiment of FIG. 15, the bypass valve 230 is eliminated and the solenoid valve 228 is replaced with a mechanically actuated valve 228' that is operated by a mechanical scale 234' to close the valve 228' when a designated volume of fluid is dispensed into the bag 250. In this case, fluid flow is initiated by a manual switch foot switch (not shown) which, in this instance, maybe coupled mechanically to the valve 228' rather than electrically to a controller. The water supply system of this embodiment is otherwise identical to the embodiment of FIG. 14, with its components being denoted as the same reference numerals as corresponding components of the system 200 of FIG. 14.

5. Watering Bag

Depending upon the configuration of the nozzle 126, hanger 124, and valve 180, a variety of disposable containers are usable with the water supply system as thus far described. The preferred container comprises a preformed plastic watering bag. In order to negate the need to provide a piercing structure on the fill nozzle 126, the bag preferably has a preformed hole for receiving the fill nozzle and, subsequently, the watering valve 180. The bag also is preferably reinforced at several locations to (1) facilitate handling, (2) inhibit puncturing of water-filled portions of the bag by an animal, and (3) cooperate with the hanger 124 to align the hole with the fill nozzle and stabilize the bag during bag filling and valve insertion. A great many bags falling within the scope of the present invention could possess several or even all of these characteristics.

Figure 17A:
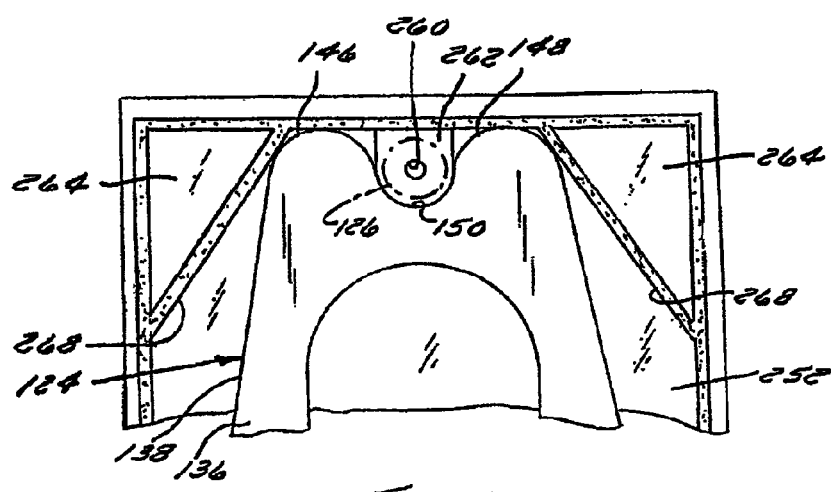
FIG. 17A is a fragmentary cut away view showing the supporting of the bag of FIGS. 16 and 17 on the hanger of the filling machine.

A specific bag 250 meeting all of these characteristics will now be described in conjunction with FIGS. 9, 13, 16, 17, and 17A. The bag 250 is formed from front and rear matched panels or strips 252 and 254 of a plastic material such as LDPE that are welded or otherwise bonded to one another around their perimeters to form a central water-holding cavity 256. Bag 250 has a top end and a bottom end, and a fill hole 260 is formed through front strip 252 adjacent the top end of the bag 250. A third strip or third panel of the same or different material is welded on three sides to the upper portion of the front strip or panel to form a flap 258. The flap 258 has a top end, bottom end, and two sides and is generally the same width as front panel 252. As seen in FIG. 16, the height of flap 258, typically will be no more than half the height of the front panel 252. Flap 258 forms a hanger for hanging the bag 250 from the hanger 124 of the bag filling machine 120 and comprises an interior pouch or pocket having an open bottom. The upper edge of flap 258 could be welded or otherwise bonded to the upper portion of the front panel 252 across the horizontal seam between the front and rear panels 252, 254. The sides of flap 258 could be bonded to the upper portion of the front panel 252, e.g., at the vertical seams between front and rear panels 252, 254 as illustrated in FIG. 16. The bottom end of flap 258 is substantially free, i.e., not bonded to front panel 252. A fill hole 260 is punched or otherwise formed through the flap 258 to correspond with fill hole 260 of the front strip 252. These fill holes receive the fill nozzle 126 and, subsequently, the watering valve 180. An area 262 is welded around the hole 260 that generally conforms in shape to the notch 150 in the hanger 124. In the preferred embodiment described thus far in which the notch 150 has a generally arcuate lower shape, the welded area 262 has a lower radius matching that of the notch 150 as best seen in FIG. 17A. This welded area 262 not only provides an improved water-tight seal around the hole 260, but also provides a resting or support region for supporting the bag 250 in the notch 150. An optional adhesive-backed skin seal could be provided over the hole 260 to provide additional assurance of sterility inside the bag during shipping and handling. An additional fill port (not shown) could be provided in the bag 250. The illustrated bag 250 is configured to water mice and, therefore, is relatively small, having an internal cavity capacity of about 15 oz. The bag 250 is approximately 8 inches high by 5.5 inches wide. The flap 258 is approximately 2.75 inches in height. The hole 260 has a diameter of approximately 0.19 inches and is located approximately 0.5 inches from the top of the bag. The welded area 262 extends about 0.28 inches beyond the hole.

The bag 250 is also preferably gusseted (1) to provide improved seals at the corners, (2) to provide grasp points for handling a full bag, and (3) to help keep corners of the bags out of reach of an animal during use. These gussets take the form of top 264 and bottom 266 solid welds at the corners of the bag 250. The edge 268 of each top weld 264 extends along a line beginning approximately 1.25 inches from the corner of the bag and ending about 2.25 inches below the top of the bag. The edge 270 of each bottom weld 266 extends along a line beginning about 3 inches above from the bottom of the bag 250 and ending about 0.75 inches inward of the corner of the bag. The sloped inner surfaces of the upper welds 264 provide guide and contact points for the lobes 146 and 148 on the upper surface of the hanger 124, further helping to keep the bag 250 from rocking during the filling and valve insertion processes. The locations, sizes, and shapes of the welded areas 264 and 266 of the bag 250 may, of course, be varied, particularly if the bag 250 is to be used with a hanger of a different configuration or sized for different applications.

FIGS. 18 and 19 exemplify the range of modifications that could possibly be made to the bag without departing from the basic concepts discussed herein. The bag 300 of FIG. 18 lacks the gussets of the bag of FIGS. 16 and 17. It also lacks the flap and, instead, has a rigid grommet 302 inserted in the fill hole 304 so as to render the bag 300 capable of being suspended directly from the nozzle as illustrated in FIG. 6B. The grommet 302 is held in place by a strip 306 of plastic welded or otherwise bonded to the front surface 308 of the bag.

The bag 310 of FIG. 19 also has a grommet 312, but the hole is formed in the top surface of the bag 310 to permit the bag to receive a downwardly extending nozzle, much as in an IV bag. This bag 310 also has wicket holes 314 for suspending the bag 310 from a support on an IV stand-type support of a refilling machine.

6. Cage Liner

Regardless of the configuration, a bag or other flexible container constructed in accordance with the preferred embodiment of the invention is preferably configured so as to be placed within the cage 82 in an orientation in which the watering valve is accessible by an animal in the cage. A standard cage, illustrated in FIGS. 21-23, has a clear plastic base 320 in which the animal is housed, a wire bar lid 322 positioned on top of the base 320, and a solid outer plastic lid or "bonnet" 324 placed on the base over the wire bar lid. The wire bar lid 322 is shaped to support a water bottle in an orientation in which the bottle's watering valve extends through the lid and into the interior of the base 320 for access by the animal. Hence, it has a bottle receiving pocket formed from front and rear sloped surfaces 326 and 328. The bag 250 is configured to rest in this pocket with the watering valve 180 extending into the interior of the base 320 for access by the animal. However, the wire bars of standard wire bar lids are spaced such that a flexible bag could slip between the wire bars and be bitten into by the animal or, alternatively, the animal could claw or bite upwardly through the wire bar lid into the bag, rupturing it.

These problems can be avoided through use of a cage liner beneath the bag 250. The preferred cage liner is a rigid guard that prevents animals in the cage 82 from being able to reach the plastic bag through the wire bar lid 322. It is designed to conform to the slope of a standard wire bar lid. It also should have a hole, slot, or notch for the passage of the watering valve 180. It also should have lateral sides that extend upwardly to hold the edge of the water bag up and away from the wire bars to prevent possible access by the animals. The bottom of the cage liner should be equipped with latches or clips that provide easy and secure attachment to the existing wire bar lid, yet permit easy removal for cleaning when required.

Figure 21:
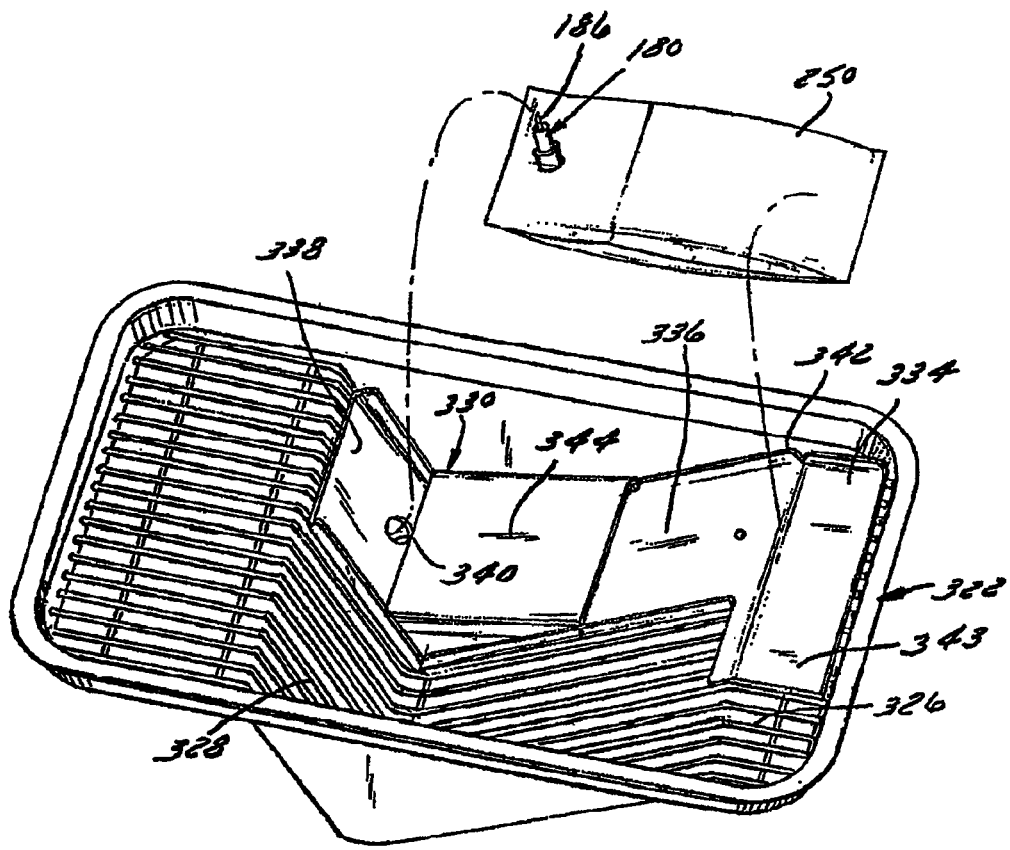
FIG. 21 is a perspective view illustrating the cage liner mounted in the cage and the mounting of an animal watering bag on the cage liner.
Figure 20:
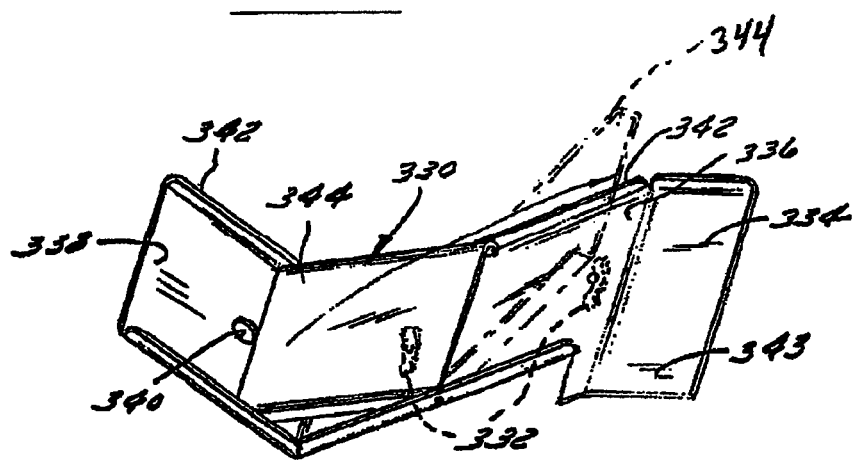
FIG. 20 is a perspective view of a cage liner usable to support the animal watering bag of FIGS. 16-17A on a wire bar lid of a cage.
Figure 22:
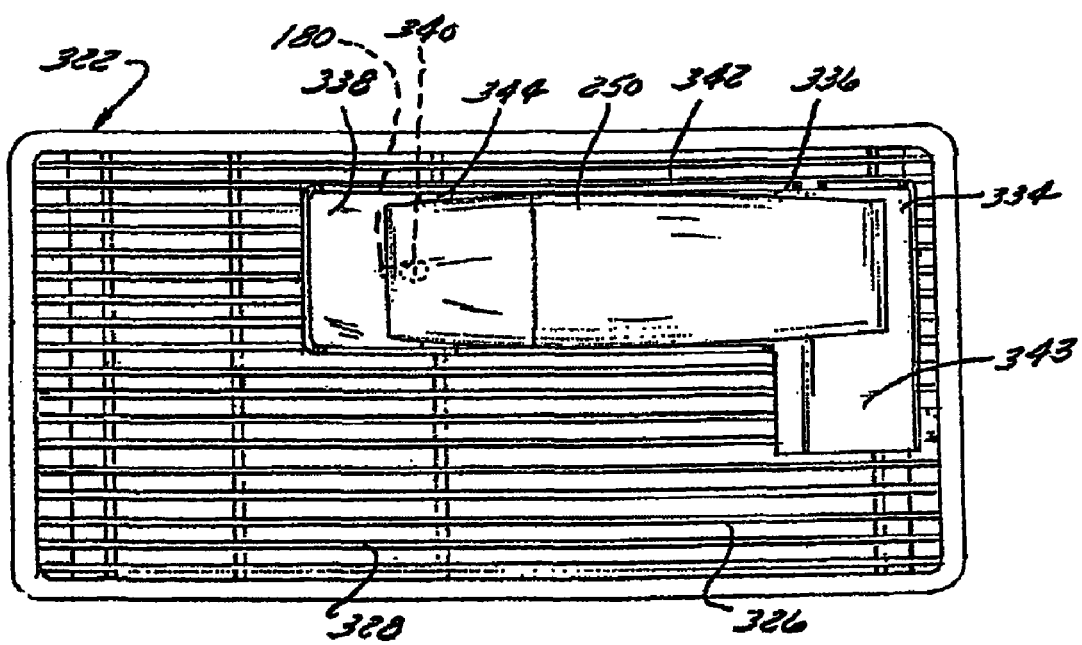
FIG. 22 is a top view of the cage with a watering bag installed in the cage.

One suitable cage liner 330 is illustrated in FIGS. 20-23. The cage liner 330 is formed from a stamped metal plate having clips 332 attached to its bottom surface. The plate has front, central, and rear portions 334, 336, and 338. The front and central portions 334 and 336 conform in shape to corresponding portions of the wire bar lid 322 as illustrated in FIGS. 21 and 22. The central portion 336 is attached to the wire bars by the clips 332. The rear portion 338 abuts the upwardly inclined rear 328 surface of the wire bar lid 322. An opening 340 is formed generally centrally through the rear portion 338 for receiving the animal watering valve 180. Side edges 342 of all three portions are bent upwardly to direct the edges of the bag 250 upwardly as previously described. Hence, when a bag 250 is positioned on the liner 330 as illustrated in FIG. 22, the edges of the bag are deflected upwardly by the upturned side edges 342 of the liner 330, and the animal watering valve 180 extends downwardly at an angle through the opening 340 for access by the animal. An additional tab 343 extends laterally from the front portion 334 to further hinder animals' access to the bags.

A shelf 344 may be provided to at least selectively permit the bag 250 to be supported in an orientation that permits the maximum possible volume of water usage. The shelf 344 is preferably a "flip-down" shelf attached to the flanges on the center portion 336 by pins 345. The shelf can be pivoted a) from a stowed position in which it rests flat against the center portion 336, hence permitting tight stacking of cage liners, b) to an operative position in which its free end rests against the front portion 334 just beneath the opening 340, hence supporting the bag at an angle that enables maximum water volume usage.

7. Water Supply Process

A preferred method of supplying water to the animals using a system as described above will now be described with primary reference to FIG. 2 and with periodic reference to other figures. First, a cart 88 is wheeled into the animal room 80 with a bulk package 121 of bags 250 on the cart. The bags in the package 121 are externally sanitized and may be internally sanitized as well. If the bags are not internally sanitized, the water should contain a biocide that sanitizes the interior of the bag upon filling. The package typically will hold from 100 to 150 bags. A separate bin 123 of pre-sterilized watering valves will also be on the cart 88 at this time. The animal care person then sanitizes the change hood 86 and prepares it for use in the usual manner. The outside of the bulk package 121 of bags and the bin 123 of sterile watering valves is sanitized and placed under the change hood. The bulk package of bags and valve bin are then opened. He or she then purges water from the water supply hoses 202, 204 using the valve 222 of FIG. 14 or 15. The purge process may be automatically controlled as well. When this initial purge cycle is complete, the animal care person sanitizes his or her gloved hands, and a water bag 250 is mounted on the hanger 124 of the filling machine 120 and filled as described above in connection with FIGS. 6-9. This bag contains potentially stagnated water from the internal lines within the bag filling machine and, therefore, is removed from the filling machine 120 and disposed of in the bag handling cart 88. The system is now ready to supply water to sterile bags.

The animal care person next sterilizes his or her gloved hands and a clean cage 82 before placing the clean cage under the change hood. He or she then removes a water bag 250 from the package 121, places it in the filling machine 120, then initiates the bag filling cycle. The bag fill level is set at a capacity that exceeds the drinking requirements of a maximum number of animals intended to be housed in a particular cage. While the bag is filling, the caregiver sanitizes the outside surface of a soiled cage 82 and places the cage under the change hood 86. The outer lid 324 is removed from the soiled cage and the wire bar lid 322 is rotated 90° to access the animal. The outer lid 324 is then removed from the clean cage 82, and the animals are transferred from the soiled cage to the clean cage. A wire bar lid 322 for the clean cage 82 is then supplied with food and placed in the clean cage. The outer lid 324 is then reinstalled on the soiled cage 82.

Next, the animal care person sanitizes his or her gloved hands and turns back to the water filling machine 120 which, by this time, has automatically terminated a fill cycle. The arm 152 is pivoted to swing the fill nozzle 126 away from the bag 250, and a clean watering valve 180 is removed from the bulk bin 123 and plugged into the hole 260 in the bag 250. The gusseted edges 264 on the bag then provide convenient grasp points where the caregiver lifts the bag 250 from the filling machine 120 and places it on top of the liner 330 in the wire bar lid of the clean cage. The outer cover 324 is then reinstalled on the base 320 of the clean cage, and the clean cage 82 is removed from the hood and placed on the rack 84.

Finally, the soiled cage 82 is removed from the change hood 86 and placed on a soiled cage cart (not shown) for transfer to a cage wash area outside of the room 80. The used water bag 250 is removed from the soiled cage. The drinking valve 180 is removed and placed into a bin 123' of soiled valves on the cart 88. The used water bag is torn on the tearing mechanism and dropped through the opening 114 into the cart's soiled bag collection basket 118. When the process of changing cages in a given animal room 80 is complete for a given day, the bag handling cart 88 and its contents can be sanitized, if required, and moved to the cage wash area and drained. The empty bags 250 can then be disposed of. The process then starts over again the next day.

8. Conclusion

It can be seen that the fill process adds very little time to the change process because it is automated and, therefore, can be performed while the animal care person is performing other functions. The typical fill cycle takes less than 30 seconds. At the same time, the time-consuming and labor intensive handling steps for cleaning and refilling conventional bottles are completely eliminated. Moreover, because the bags 250 are supplied and stored in a sterile bulk package and are filled and placed in the cages 82 under a sanitary change hood 86, the risk of contamination is dramatically reduced when compared to filling and changing water bottles in prior water supply systems.

Many changes of modifications may be made within the scope of the invention without departed from the spirit thereof. The scope of some of these changes is discussed above. The scope of other changes will become apparent from the appended claims.

We claim:

1. A bag filling machine and an animal watering bag combination comprising: a bag filling machine including a hanger and a fill nozzle that dispenses water; and an animal watering bag that receives water from the fill nozzle while the bag is suspended from the hanger of the bag filling machine, the bag comprising:
    (A) first and second panels bonded to one another to form a sealed interior cavity for receiving drinking water; and
    (B) a hanger provided on the bag and configured to suspend the bag from the hanger of the bag filling machine, wherein
        a fill hole through which water is dispensed from the fill nozzle into the bag, wherein the fill hole is formed through a reinforced portion of the bag and opens into the cavity, wherein
        the hanger of the bag comprises a flap bonded to an upper portion of the first panel, and wherein
        the flap overlies the upper portion of the first panel to define an open-bottomed pocket between the flap and the first panel for receiving the hanger of the bag filling machine.

2. The combination as recited in claim 1, wherein the bag is gusseted at least two corners thereof to separate the cavity from the corresponding corners of the bag.

3. The combination as recited in claim 2, wherein the bag is gusseted at four corners thereof.

4. The combination as recited in claim 2, wherein the reinforced portion is reinforced via a grommet extending though the fill hole.

5. The combination as recited in claim 1, wherein the reinforced portion comprises a bonded region that at least partially surrounds the fill hole.

6. The combination as recited in claim 1, wherein the flap is formed from a third panel that is bonded to the upper portion of the first panel on three sides of the third panel.

7. The combination as recited in claim 1, wherein the bag is gusseted at opposed upper corners thereof, the gussets extending (1) through the first and second panels to separate the cavity from the corresponding corners of the bag and (2) through the flap to define hanger guides on opposite sides of the fill hole.

8. The combination as recited in claim 1, wherein the fill hole and a bonded region surrounding the fill hole extend through the flap and the first panel.

9. The combination as recited in claim 1, wherein the flap is welded to the upper portion of the first panel.

10. A bag filling machine and an animal watering bag combination comprising: a bag filling machine including a hanger and a fill nozzle that dispenses water; and an animal watering bag that receives water from the fill nozzle while the bag is suspended from the hanger of the bag filling machine, the bag comprising:
    (A) first and second panels bonded to one another around perimeters thereof to define an interior cavity for receiving drinking water;
    (B) a flap having upper and side edges bonded to corresponding edges of the first panel, a bottom edge of the flap being free to thereby form a pocket between the flap and the first panel for suspending the bag from the hanger of the bag filling machine, wherein
        (1) a fill hole is formed through the flap and the first panel, the fill hole being dimensioned to alternatively receive the fill nozzle and an animal watering valve,
        (2) a region of the bag surrounding the fill hole is reinforced by welding the flap to the first panel, and
        (3) opposed upper corners of the bag are gusseted to separate the cavity from the corners, thereby forming guides in the pocket for aligning the bag with the hanger of a bag filling machine and grasping regions in the gusseted areas that remain free of water after the bag is filled.

11. The combination as recited in claim 10, wherein the upper and side edges of the bag are welded to corresponding edges of the first panel.

12. A bag filling machine and an animal watering bag combination comprising: a bag filling machine including a hanger and a fill nozzle that dispenses water; and an animal watering bag that receives water from the fill nozzle while the bag is suspended from the hanger of the bag filling machine, the bag comprising:
    (A) first and second panels bonded to one another around entire perimeters thereof to form a sealed interior cavity for receiving drinking water, each of the panels having upper and lower ends, the first panel having a fill hole formed therein between the upper and lower ends that receives water from the fill nozzle; and
    (B) a hanger provided on the bag and configured to suspend the bag from the hanger of the bag filling machine, the hanger of the bag being formed from a strip of material bonded to the first panel between the upper and lower ends thereof to define an open-bottomed pouch between the strip and the first panel for suspending the bag from the hanger of the bag filling machine.

13. The combination as recited in claim 12, wherein the fill hole also extends through the strip of material.

14. The combination as recited in claim 12, wherein the strip of material is a flap that extends across an entire width of the first panel.

15. The combination as recited in claim 12, wherein the strip of material extends downwardly from the upper end of the first panel toward the bottom end.

16. The as recited in claim 12, wherein the first and second panels and the strip of material are all formed from a flexible plastic material.

17. A bag filling machine and an animal watering bag combination comprising: a bag filling machine including a hanger and a fill nozzle that dispenses water; and an animal watering bag that receives water from the fill nozzle while the bag is suspended from the hanger of the bag filling machine, the bag comprising:
 (A) first and second flexible plastic panels bonded to one another around an entire perimeter thereof to form a sealed interior cavity for receiving drinking water; and
 (B) a hanger provided on the bag and configured to suspend the bag from the hanger of the bag filling machine, wherein
  the hanger of the bag comprises a flap of a flexible plastic material that is welded to the first panel and that extends downwardly to define an open-bottomed pocket between the flap and the first panel for suspending the bag from the hanger of the bag filling machine, and
  a fill that receives water from the fill nozzle, wherein the fill hole hole is formed through the flap and the first panel at a location beneath an upper end of the first panel and opens into the cavity.

18. The combination as recited in claim 17, wherein the flap extends across an entire width of the first panel.

19. The combination as recited in claim 17, wherein an upper end of the flap is welded to an upper end of the first panel.

20. The combination as recited in claim 17, wherein the fill hole is formed through a portion of the bag that is reinforced at a bonded region that at least partially surrounds the fill hole.

21. A bag filling machine and an animal watering bag combination comprising: a bag filling machine including a hanger and a fill nozzle that dispenses water; and an animal watering bag that receives water from the fill nozzle while the bag is suspended from the hanger of the bag filling machine, the bag comprising:
 a first panel and a second panel bonded together to form a bag having a top end and a bottom end, wherein a fill hole is formed in the first panel in a location generally adjacent the top end the fill hole receiving water from the nozzle; and
 a third panel that overlies a portion of the first panel that contains the fill hole, the first panel having a top end, a bottom end, and two sides, wherein the third panel is bonded to the first panel at the top end of the bag along a horizontal seam and first and second spaced side seams to form an open-bottomed pouch via which the bag can be hung from the hanger of the bag filling machine.

22. The combination of claim 21, wherein the third panel is of at least generally the same width as the first panel.

23. The combination of claim 22, wherein the height of the third panel is no more than half the height of the first panel.

24. The combination of claim 23, wherein a fill hole is formed in the third panel at a location that is aligned with the fill hole formed in the first panel.

25. A bag filling machine and an animal watering bag combination comprising: a bag filling machine including a hanger and a fill nozzle that dispenses water; and an animal watering bag that receives water from the fill nozzle while the bag is suspended from the hanger of the bag filling machine, the bag comprising:
 (A) first and second panels bonded to one another along perimeters thereof to form a sealed interior cavity for receiving drinking water, wherein a fill hole is formed through the first panel and opens into the cavity, wherein the fill hole receives water from the fill nozzle, and wherein the second panel is imperforate; and
 (B) a third panel bonded to an outer surface of the first panel at a horizontal seam extending along an upper edge portion of the third panel and first and second vertical seams located on opposite sides of the fill hole, the first and second vertical seams extending from the upper end portion of the third panel to a location beneath the fill hole, an area between the horizontal seam and a bottom of the third panel being open to define an interior pouch via which the bag can be suspended from the hanger of the bag filling machine.

26. The combination as recited in claim of claim 25, wherein the third panel is substantially the same width as the first panel.

27. The combination as recited in claim of claim 25, wherein the first and second vertical seams coincide with side seams via which the first and second panels are bonded together.

28. The combination as recited in claim of claim 25, wherein a hole is formed through the third panel in alignment with the hole in the first panel.

29. A bag filling machine and an animal watering bag combination comprising: a bag filling machine including a hanger and a fill nozzle that dispenses water; and an animal watering bag that receives water from the fill nozzle while the bag is suspended from the hanger of the bag filling machine, the bag comprising:
 (A) first and second rectangular panels bonded to one another along perimeters thereof to form a sealed interior cavity for receiving drinking water, wherein a fill hole is formed through the first panel and opens into the cavity, wherein the fill hole receives water from the fill nozzle, and wherein the second panel is imperforate; and
 (B) a third rectangular panel overlying the first panel and extending from a top edge of the first panel to a location beneath the fill hole and terminating in a bottom edge located well above a bottom edge of the first panel, the third panel being at least substantially the same width as the first panel and being welded to the first panel at a horizontal seam extending along an upper edge portion of the third panel and first and second vertical seams located on opposite sides of the fill hole, the first and second vertical seams coinciding with side seams via which the first and second panels are bonded together and extending at least substantially the entire height of the third panel, an area between the horizontal seam and a bottom of the third panel being open to define an interior pouch via which the bag can be suspended from the hanger of the bag filling machine, and a hole being formed through the third panel in alignment with the hole in the first panel.

* * * * *